(12) United States Patent
Bando et al.

(10) Patent No.: US 11,834,041 B2
(45) Date of Patent: Dec. 5, 2023

(54) CONVEYING VEHICLE

(71) Applicant: Hitachi Construction Machinery Co., Ltd., Tokyo (JP)

(72) Inventors: Mikio Bando, Tokyo (JP); Shinichi Uotsu, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 9 days.

(21) Appl. No.: 17/641,721

(22) PCT Filed: Jun. 8, 2020

(86) PCT No.: PCT/JP2020/022548
§ 371 (c)(1),
(2) Date: Mar. 9, 2022

(87) PCT Pub. No.: WO2021/053897
PCT Pub. Date: Mar. 25, 2021

(65) Prior Publication Data
US 2022/0314986 A1 Oct. 6, 2022

(30) Foreign Application Priority Data
Sep. 17, 2019 (JP) ................................. 2019-168589

(51) Int. Cl.
*B60W 30/14* (2006.01)
*B60W 40/10* (2012.01)

(52) U.S. Cl.
CPC ..... *B60W 30/143* (2013.01); *B60W 2300/125* (2013.01); *B60W 2300/17* (2013.01);
(Continued)

(58) Field of Classification Search
CPC ......... B60W 30/143; B60W 2300/125; B60W 2300/17; B60W 2520/26; B60W 2720/10;
(Continued)

(56) References Cited

U.S. PATENT DOCUMENTS

2001/0054954 A1* 12/2001 Matsumoto ........ B60K 31/0008
340/425.5
2003/0010559 A1* 1/2003 Suzuki ................... B60K 28/16
180/233
(Continued)

FOREIGN PATENT DOCUMENTS

CN 101230918 A 7/2008
CN 104507767 A 4/2015
(Continued)

OTHER PUBLICATIONS

Chinese-language Office Action issued in Chinese Application No. 202080063038.7 dated Apr. 14, 2023 (10 pages).
(Continued)

*Primary Examiner* — Jason Holloway
(74) *Attorney, Agent, or Firm* — Crowell & Moring LLP

(57) ABSTRACT

Provided is a conveying vehicle that ensures efficiently travelling while suppressing vehicle slip. A dump truck 100 includes a vehicle body 101 provided with wheels 103 and a vehicle control device 300 and travels on a travel route. The vehicle control device 300 calculates and stores slip limit values at a plurality of positions on the travel route, reads out the slip limit values to calculate at least one of a maximum acceleration and a maximum deceleration of the dump truck 100 at which the wheels 103 is capable of maintaining a grip state against a road surface, and sets a target travel speed at a travel position between the dump truck 100 and a target position according to a target speed at the target position and at least one of the maximum acceleration and the maximum deceleration.

6 Claims, 25 Drawing Sheets

(52) U.S. Cl.
CPC ..... *B60W 2520/26* (2013.01); *B60W 2720/10* (2013.01); *B60W 2720/106* (2013.01)

(58) Field of Classification Search
CPC ..... B60W 2720/106; B60W 2520/105; B60W 2520/125; B60W 2520/14; B60W 2520/16; B60W 2520/18; B60W 2520/28; B60W 2530/10; B60W 2540/18; B60W 2556/60; B60W 2720/28; B60W 30/18172; B60W 40/10; B60W 40/105; B60W 40/107; B60W 2520/10; G05D 1/027; G05D 1/0278; G05D 1/0223; G05D 2201/021
See application file for complete search history.

(56) References Cited

U.S. PATENT DOCUMENTS

| | | |
|---|---|---|
| 2008/0182721 A1 | 7/2008 | Saitou et al. |
| 2009/0055068 A1* | 2/2009 | Osaki ................. B60K 28/16 |
| | | 701/87 |
| 2014/0297079 A1* | 10/2014 | Saitoh ................ B60W 10/06 |
| | | 903/930 |
| 2014/0358382 A1* | 12/2014 | Kou ..................... E21C 47/00 |
| | | 701/50 |
| 2015/0224978 A1 | 8/2015 | Shimizu |
| 2016/0221446 A1 | 8/2016 | Suzuki et al. |

FOREIGN PATENT DOCUMENTS

| | | |
|---|---|---|
| CN | 109374315 A | 2/2019 |
| JP | 2-189236 A | 7/1990 |
| JP | 2006-79436 A | 3/2006 |
| JP | 2009-51310 A | 3/2009 |
| JP | 2011-13895 A | 1/2011 |
| JP | 2013-196051 A | 9/2013 |
| WO | WO 2013/175567 A1 | 11/2013 |
| WO | WO 2014/156903 A1 | 10/2014 |

OTHER PUBLICATIONS

International Search Report (PCT/ISA/210) issued in PCT Application No. PCT/JP2020/022548 dated Aug. 25, 2020 with English translation (four (4) pages).

Japanese-language Written Opinion (PCT/ISA/237) issued in PCT Application No. PCT/JP2020/022548 dated Aug. 25, 2020 (four (4) pages).

Extended European Search Report issued in European Application No. 20865324.6 dated Sep. 5, 2023 (10 pages).

* cited by examiner

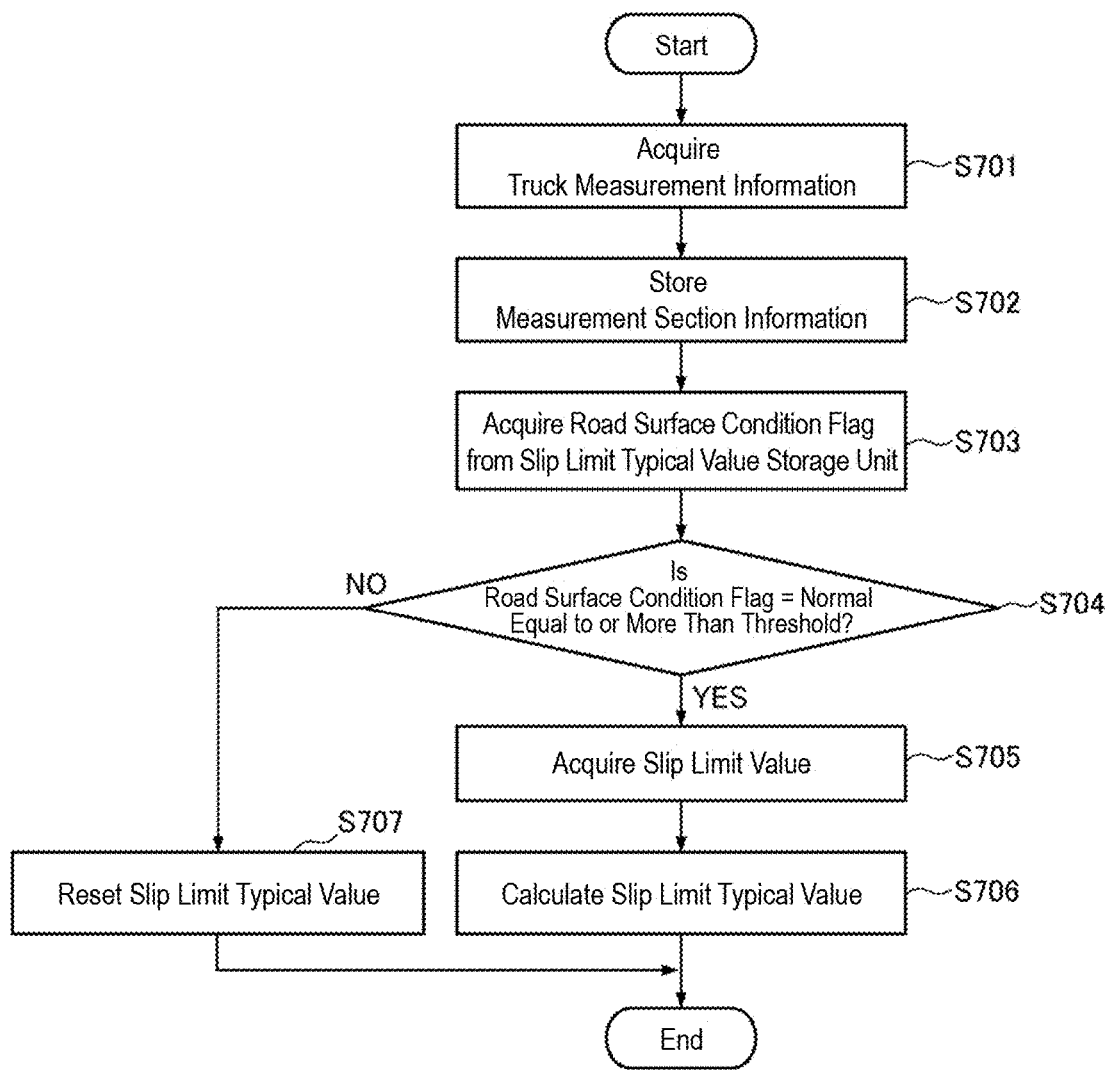

Fig. 8

Measurement Information Table

| Position | Acceleration/ Deceleration | Vehicle Weight | Slip Limit Value | |
|---|---|---|---|---|
| x1,y1 | $\alpha(t)$ | M | $\mu_{lim}1$ | } Measurement Section ID: 1 |
| x2,y2 | $\alpha(t)$ | M | $\mu_{lim}2$ | |
| ... | ... | ... | ... | |
| xn,yn | $\alpha(t)$ | 2M | $\mu_{lim}n$ | } Measurement Section ID: $n$ |
| ... | ... | ... | ... | |

Fig. 10

Measurement Section Information Table

| | Time | t1 | t2 | t3 | ... |
|---|---|---|---|---|---|
| Measurement Section ID: 1 | Slip Limit Value | $\mu_{lim}$ | — | $\mu_{lim}'$ | ... |
| | Acceleration/Deceleration | $\alpha$ | — | $\alpha'$ | ... |
| | Vehicle Weight | M | — | m | ... |
| ... | ... | ... | ... | ... | ... |

Fig. 11

Measurement Section Table

| Measurement Section ID | Starting Point Position | Ending Point Position | Gradient | Curvature Radius | Slip Limit Typical Value | Road Surface Condition Flag |
|---|---|---|---|---|---|---|
| 1 | x1,y1 | x2,y2 | $\phi 1$ | R1 | $\mu_{lim}1$ | 1 (Normal) |
| 2 | x2,y2 | x3,y3 | $\phi 2$ | R2 | $\mu_{lim}2$ | 1 (Normal) |
| ... | ... | ... | ... | ... | ... | ... |
| n | xn,yn | xm,ym | $\phi n$ | Rn | $\mu_{lim}n$ | 0 (Change) |
| ... | ... | ... | ... | ... | ... | ... |

Fig. 13

Road Surface Information Table

| Measurement Section ID | Average of Slip Limit Values | Slip Limit Typical Value | Slip Limit Typical Value (1 Unit Time Ago) | ... | Slip Limit Typical Value (k Unit Times Ago) | Road Surface Condition Flag |
|---|---|---|---|---|---|---|
| 1 | $\mu_{ave}$ | $\mu_{lim}1(0)$ | $\mu_{lim}1(1)$ | ... | $\mu_{lim}1(k)$ | 1 (Normal) |
| 2 | | $\mu_{lim}2(0)$ | $\mu_{lim}2(1)$ | ... | $\mu_{lim}2(k)$ | 1 (Normal) |
| ... | | ... | ... | ... | ... | ... |
| n | | $\mu_{lim}n(0)$ | $\mu_{lim}n(1)$ | ... | $\mu_{lim}n(k)$ | 0 (Change) |
| ... | | ... | ... | ... | ... | ... |

Fig. 17

Slip Limit Series ⎯⎯⎯⎯⎯⎯⎯⎯→ Position Far from Current Position

| Starting Point Position | x1,y1 | x2,y2 | ... | xm,ym | ... |
|---|---|---|---|---|---|
| Ending Point Position | x2,y2 | x3,y3 | ... | xn,yn | ... |
| Slip Limit | $\mu_{lim}1$ | $\mu_{lim}2$ | ... | $\mu_{lim}n$ | ... |

Fig. 19

| Maximum Acceleration/Deceleration Series | → Position Far from Current Position | | | | |
|---|---|---|---|---|---|
| Starting Point Position | x1,y1 | x2,y2 | ... | xm,ym | ... |
| Ending Point Position | x2,y2 | x3,y3 | ... | xn,yn | ... |
| Maximum Acceleration/Deceleration | $\alpha_{max}1$ | $\alpha_{max}2$ | ... | $\alpha_{max}m$ | ... |

Fig. 21

| Target Travel Speed Series | | | → | Position Far from Current Position | |
|---|---|---|---|---|---|
| Starting Point Position | x1,y1 | x2,y2 | ... | xm,ym | ... |
| Ending Point Position | x2,y2 | x3,y3 | ... | xn,yn | ... |
| Target Travel Speed | $v1$ | $v2$ | ... | $vm$ | ... |

Fig. 25

Measurement Section Information Table

| | Dump Truck | t1 | t2 | t3 | ... |
|---|---|---|---|---|---|
| Measurement Section ID: 1 | Slip Limit Value | $\mu_{lim}$ | — | $\mu_{lim}'$ | ... |
| | Acceleration | $\alpha$ | — | $\alpha'$ | ... |
| | Vehicle Weight | M | — | m | ... |
| ... | ... | ... | ... | ... | ... |

CONVEYING VEHICLE

TECHNICAL FIELD

The present invention relates to a conveying vehicle including a vehicle body provided with wheels.

BACKGROUND ART

Conventionally, in a conveying vehicle that travels using wheels, such as a dump truck, wheel slip has been a problem from the standpoint of safety aspect and economic aspect. In particular, when an unattended dump truck (conveying vehicle) is operated, it is necessary to avoid a wheel slipping against a road surface and making it impossible to brake the vehicle. Therefore, an acceleration/deceleration is lowered to gradually change a vehicle speed. In view of this, since a long braking distance and a long acceleration distance should be ensured, travelling efficiency of the dump truck is decreased.

For example, Patent Literature 1 discloses an operation management system for mining machine that generates speed limit information for changing a speed limit for the mining machine to travel on the travel path corresponding to the travel path information, based on travel path information including at least information on moisture content of a travel path on which a mining machine operating in a mine and position information as information on a position of the travel path corresponding to the travel path information.

CITATION LIST

Patent Literature

Patent Literature 1: JP 2013-196051 A

SUMMARY OF INVENTION

Technical Problem

However, in Patent Literature 1, a travel path ranking is set based on the moisture content of the travel path and the like, and the speed limit is changed according to the travel path ranking. In view of this, for example, a problem arises in that, when a vehicle is stopped at a target stop position, a wheel slips due to sudden deceleration, making it impossible to brake the vehicle in some cases.

The present invention has been made in view of such an aspect, and has an object to provide a conveying vehicle that can efficiently travel while suppressing vehicle slip.

Solution to Problem

In order to solve the above-described problems, a conveying vehicle according to the invention comprise a vehicle body provided with a wheel and a vehicle control device. The conveying vehicle travels on a travel route. The vehicle control device: calculates slip rates of the wheel at a plurality of positions on the travel route; calculates and stores a slip limit value from each of the slip rates, the slip limit value being a friction coefficient value between a road surface and the wheel at a boundary of a grip state and a slip state of the wheel against the road surface at each of the plurality of positions; reads out the slip limit value to calculate at least one of a maximum acceleration and a maximum deceleration of the conveying vehicle at which the wheel is capable of maintaining the grip state against the road surface at each of the plurality of positions; and during travelling to a target position on the travel route, sets a target travel speed at a travel position between the conveying vehicle and the target position according to a target speed at the target position and at least one of the maximum acceleration and the maximum deceleration calculated from the slip limit value when the conveying vehicle travels at the travel position.

In the description and claims, the grip state is a state in which the slip rate of a wheel against a road surface is equal to or less than a predetermined threshold (generally about 0.2) and the slip state is a state in which the slip rate is greater than the predetermined threshold. In the grip state, the wheel has a grip force against the road surface, and for example, braking of the vehicle is possible. On the other hand, in the slip state, the wheel does not have the grip force against the road surface, and for example, braking of the vehicle is impossible.

Advantageous Effects of Invention

The present invention ensures providing a conveying vehicle that can efficiently travel while suppressing vehicle slip.

BRIEF DESCRIPTION OF DRAWINGS

FIG. 7 is a drawing illustrating a slip limit typical value determination flow.

FIG. 8 is a drawing illustrating a measurement information table.

FIG. 10 is a drawing illustrating a measurement section information table.

FIG. 11 is a drawing illustrating a measurement section table.

FIG. 13 is a drawing illustrating a road surface information table.

FIG. 17 is a drawing illustrating a slip limit series.

FIG. 19 is a drawing illustrating a maximum acceleration/deceleration series.

FIG. 21 is a drawing illustrating a target travel speed series.

FIG. 25 is a drawing illustrating a measurement section information table of the second embodiment of the present invention.

DESCRIPTION OF EMBODIMENTS

The following describes a conveying vehicle according to embodiments of the present invention.

First Embodiment

Figure 1:
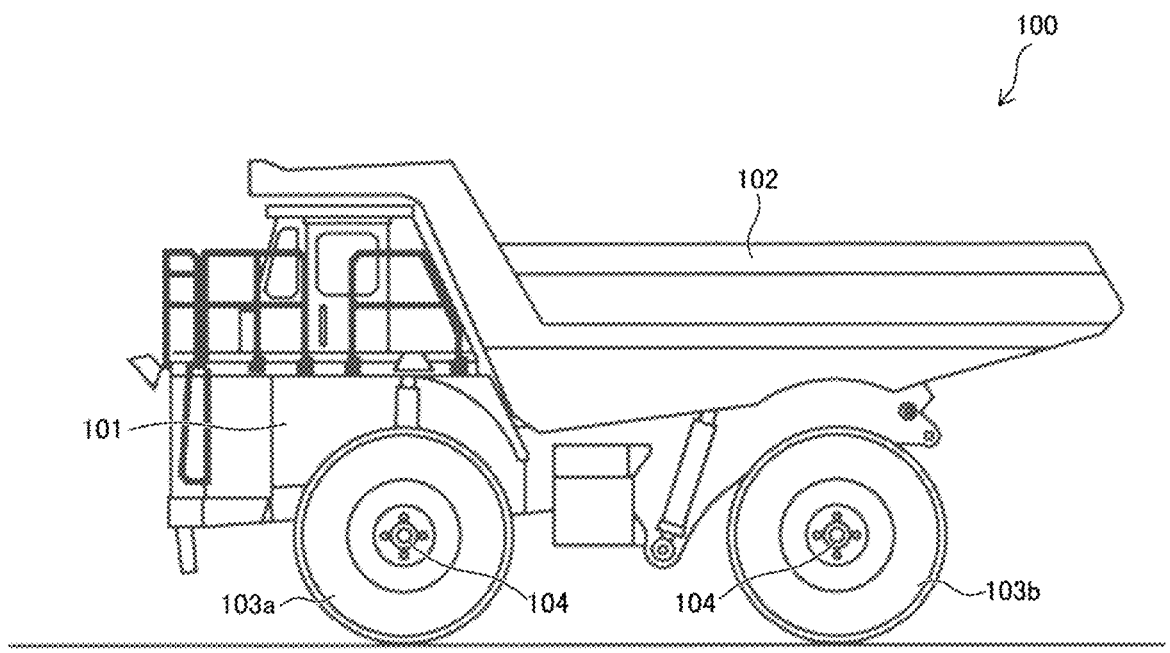
FIG. 1 is a side view of a dump truck according to a first embodiment of the present invention.

With reference to FIG. 1 to FIG. 21, a dump truck 100 (hereinafter, also simply referred to as a vehicle) that is one example of a conveying vehicle according to the first embodiment of the present invention will be described. FIG. 1 is a side view of the dump truck 100 according to the first embodiment of the present invention.

The dump truck 100 illustrated in FIG. 1 is what is called an unattended dump truck that does not require a driver and is mainly used in a mine. The dump truck 100 includes a vehicle body 101 that is a sturdy frame extending in a front-rear direction, a loading platform (vessel) 102 that is disposed on an upper portion of the vehicle body 101 and loads crushed stones and the like, and wheels 103 (front wheels 103a, rear wheels 103b). To the vehicle body 101, wheel shafts 104 of the wheels 103 are installed via suspensions having a spring and the like. The front wheels 103a are steerable to right and left.

In the vehicle body 101, an engine (not illustrated) that is a driving source for causing the dump truck 100 to travel and a brake (not illustrated) that gives a braking force to the dump truck 100 are disposed. The driving source is not limited only to the engine. For example, an electric generator, such as a motor-generator, may be installed on an output shaft of the engine, and the generated power of the electric generator may be supplied to a travelling motor to rotate the wheels 103 by the travelling motor. Further, electric power may be supplied from a storage battery to the travelling motor to rotate the wheels 103 by the travelling motor.

Figure 2:
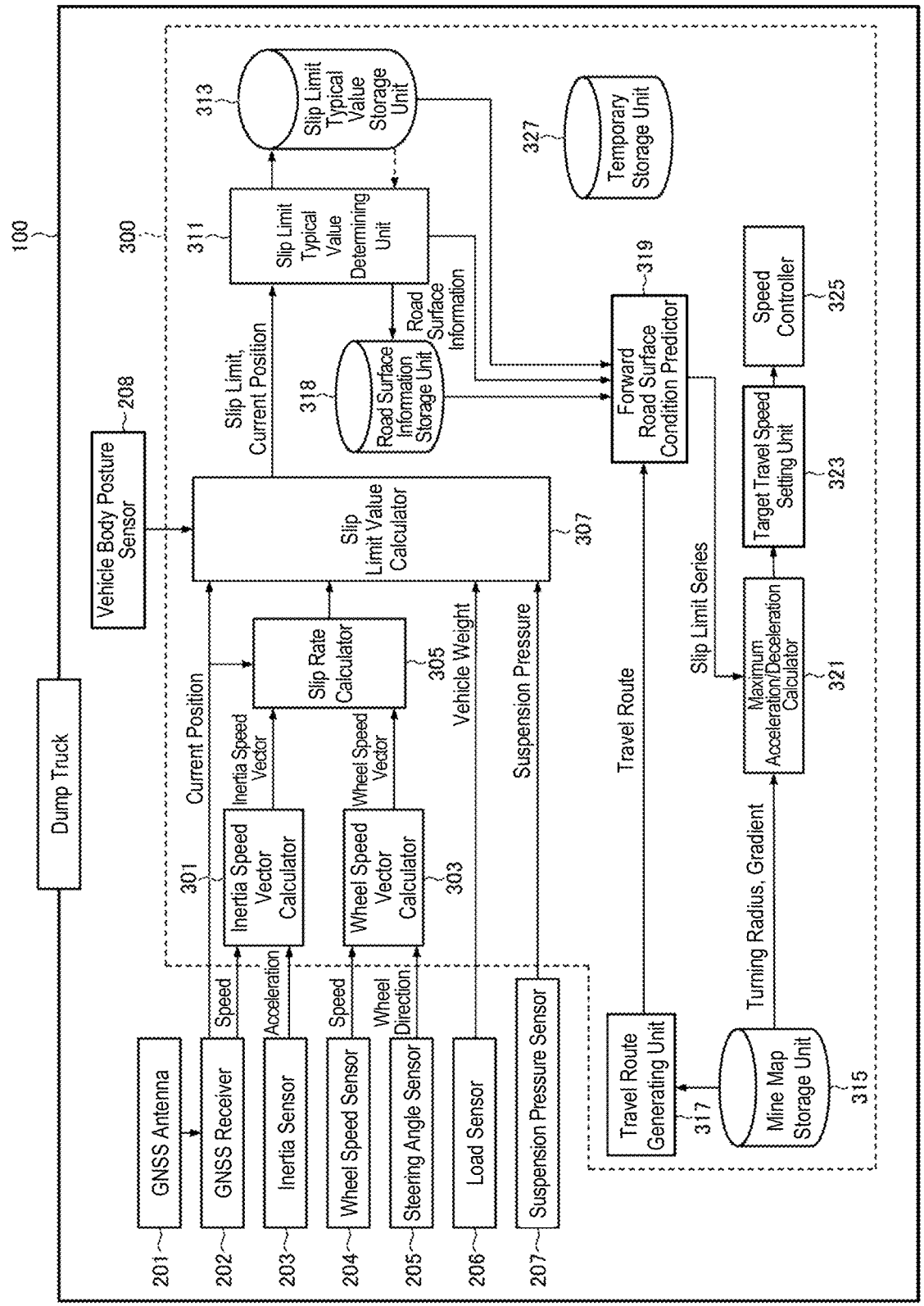
FIG. 2 is a drawing illustrating a configuration of the dump truck according to the first embodiment of the present invention.

FIG. 2 is a drawing illustrating a configuration of the dump truck 100 according to the first embodiment of the present invention. As illustrated in FIG. 2, in the dump truck 100, a Global Navigation Satellite System (GNSS) antenna 201, a GNSS receiver 202, an inertia sensor 203, a wheel speed sensor 204, a steering angle sensor 205, a load sensor 206, a suspension pressure sensor 207, a vehicle body posture sensor 208, and a vehicle control device 300 are disposed.

The GNSS antenna 201 receives a radio wave from a positioning satellite, such as a Global Positioning System (GPS). The GNSS receiver 202 calculates a position and a speed of the dump truck 100 based on information received by the GNSS antenna 201. The inertia sensor 203 includes an acceleration sensor and an angular speed sensor that measure an acceleration and an angular speed of the vehicle body 101. The inertia sensor 203 measures the acceleration including a gravitational acceleration, the angular speed, and the like by a vehicle body coordinate system b that is a coordinate system secured to the vehicle body 101.

The wheel speed sensor 204 measures an advance speed of the wheels 103 against a road surface from a rotation speed of the wheels 103. The steering angle sensor 205 measures a steering direction and a steering angle of the wheels 103 (here, the front wheels 103a). The load sensor 206 measures a load weight of the dump truck 100. The suspension pressure sensor 207 measures a pressure of the suspensions that connect each of the wheels 103 to the vehicle body 101.

The vehicle body posture sensor 208 measures a vehicle body posture represented by an inclination angle that is formed by a horizontal plane constituted by an Xe axis and a Ye axis of a global coordinate system e and an Xb axis and a Yb axis of the vehicle body coordinate system b and by a rotation angle from the Xe axis of the global coordinate system e to the Xb axis of the vehicle body coordinate system b. The global coordinate system e refers to a three-axis orthogonal coordinate system in which, with an arbitrary point on earth as the origin, the Xe axis and the Ye axis are set on a plane (horizontal plane) perpendicular to a gravity direction and a Ze axis is set in the opposite direction to the gravity direction. The vehicle body coordinate system b refers to a three-axis orthogonal coordinate system in which, with an arbitrary point inside the vehicle body as the origin, the Xb axis is set in a vehicle body front-rear direction, the Yb axis is set in a vehicle body right-left direction, and a Zb axis is set in a vehicle body upward direction.

The vehicle control device 300 has an inertia speed vector calculator 301, a wheel speed vector calculator 303, a slip rate calculator 305, a slip limit value calculator 307, a slip limit typical value determining unit 311, a slip limit typical value storage unit 313, a mine map storage unit 315, a travel route generating unit 317, a road surface information storage unit 318, a forward road surface condition predictor 319, a maximum acceleration/deceleration calculator 321, a target travel speed setting unit 323, a speed controller 325, and a temporary storage unit 327.

The inertia speed vector calculator 301 calculates an inertia speed vector of the dump truck 100 from outputs of the GNSS receiver 202 and the inertia sensor 203. The wheel speed vector calculator 303 calculates a wheel speed vector of the dump truck 100 from outputs of the wheel speed sensor 204 and the steering angle sensor 205. The slip rate calculator 305 calculates a slip rate from the inertia speed vector and the wheel speed vector.

The slip limit value calculator 307 calculates a slip limit value at each position from the slip rate, an acceleration/deceleration, a vehicle weight, and the like of the dump truck 100. The slip limit typical value determining unit 311 calculates a slip limit typical value from a plurality of slip limit values. The slip limit typical value storage unit 313 stores the slip limit typical value.

In the mine map storage unit 315, mine map data is preliminary stored. The mine map data includes position information of a loading site, a dumping site, and a conveyance path connecting the loading site and the dumping site, information of a gradient and a curvature radius of the conveyance path at each position, and the like. The travel route generating unit 317 generates travel route data on which the dump truck 100 travels from the mine map data.

The road surface information storage unit 318 stores road surface information described later. The forward road surface condition predictor 319 predicts a road surface condition ahead of the dump truck 100 from the road surface information and the travel route data. The maximum acceleration/deceleration calculator 321 calculates at least one of a maximum acceleration and a maximum deceleration at which the wheels 103 can maintain the grip state against the road surface from the road surface condition (slip limit typical value) ahead of the dump truck 100. In this embodiment, the maximum acceleration/deceleration calculator 321 calculates both the maximum acceleration and the maximum deceleration. In the following description, at least one of the maximum acceleration and the maximum deceleration is simply referred to as the "maximum acceleration/deceleration" in some cases.

During travelling to a target position on the travel route, from the maximum acceleration/deceleration and a target speed at the target position, the target travel speed setting unit 323 sets each target travel speed at one or more travel positions that exist between an own vehicle (dump truck 100) and the target position on a planned travel route. The speed controller 325 controls a travel speed of the dump truck 100 such that the travel speed of the dump truck 100 becomes the target travel speed at each of the travel positions. The temporary storage unit 327 stores various kinds of data.

In this embodiment, from the ease of slipping on a road surface, the maximum acceleration/deceleration (here, both the maximum acceleration and the maximum deceleration) of the dump truck 100 at which the wheels 103 can maintain the grip state against the road surface is calculated, and by setting the target travel speed at each of the travel positions so as not to exceed the maximum acceleration/deceleration, the slip (slip state) in which travel control of the dump truck 100 is impossible is suppressed. Here, from the inertia speed vector calculated from the output values of the GNSS receiver 202 and the inertia sensor 203 at each position during the travel and the wheel speed vector calculated from the output values of the wheel speed sensor 204 and the steering angle sensor 205, the slip rate at each position is calculated. From the slip rate, the acceleration/deceleration, the vehicle weight, and the like at each position, the slip limit value at each position is calculated. The slip limit value at each position refers to a friction coefficient value between a road surface and the wheels 103 at the boundary of the grip state and the slip state of the wheels 103 against the road surface. In order to calculate the slip limit value at each position, the dump truck 100 does not have to actually switch from the grip state to the slip state during the travel, and the slip limit value can be calculated using the slip rate in the grip state. Since the dump truck 100 repeatedly passes the travel route, the slip limit value is updated every time the dump truck 100 passes the same position. From this slip limit value and past slip limit values, the road surface condition ahead of the dump truck 100 is predicted, and the maximum acceleration/deceleration that does not cause the dump truck 100 to be in the slip state (for example, a state where braking is impossible) is calculated.

The dump truck 100 travels by setting the target travel speed at each position so as not to exceed the maximum acceleration/deceleration. A method of setting the target travel speed at each position so as not to exceed the maximum acceleration/deceleration will be briefly described. Here, for example, a case where the dump truck 100 that is travelling at a predetermined limiting speed is stopped at a target position (a case where the target speed at the target position is zero) will be described. In the case where the dump truck 100 is decelerated at the maximum deceleration to the speed of zero from the limiting speed, a distance (braking distance) from a deceleration start position to a stop position is calculated by ½×(maximum deceleration×braking period^2). The braking period (period from the start of decelerating to the speed of zero) is a value obtained by dividing the limiting speed by the maximum deceleration. Since the calculated braking distance does not take the slip into consideration, the actual braking distance becomes longer by the slip rate (generally about 0.2) at the boundary of the grip state and the slip state. In view of this, it is only necessary to start the decelerating at a position (decelerating start position) on the near side by the amount of the braking distance taking the slip rate into consideration from the target position. Accordingly, from a current position of the dump truck 100 to the decelerating start position, it is only necessary to set the limiting speed to the target travel speed. At each position from a braking start position to the target position, it is only necessary to set a speed that is lowered from the limiting speed at a constant ratio to the target travel speed.

Figure 3:
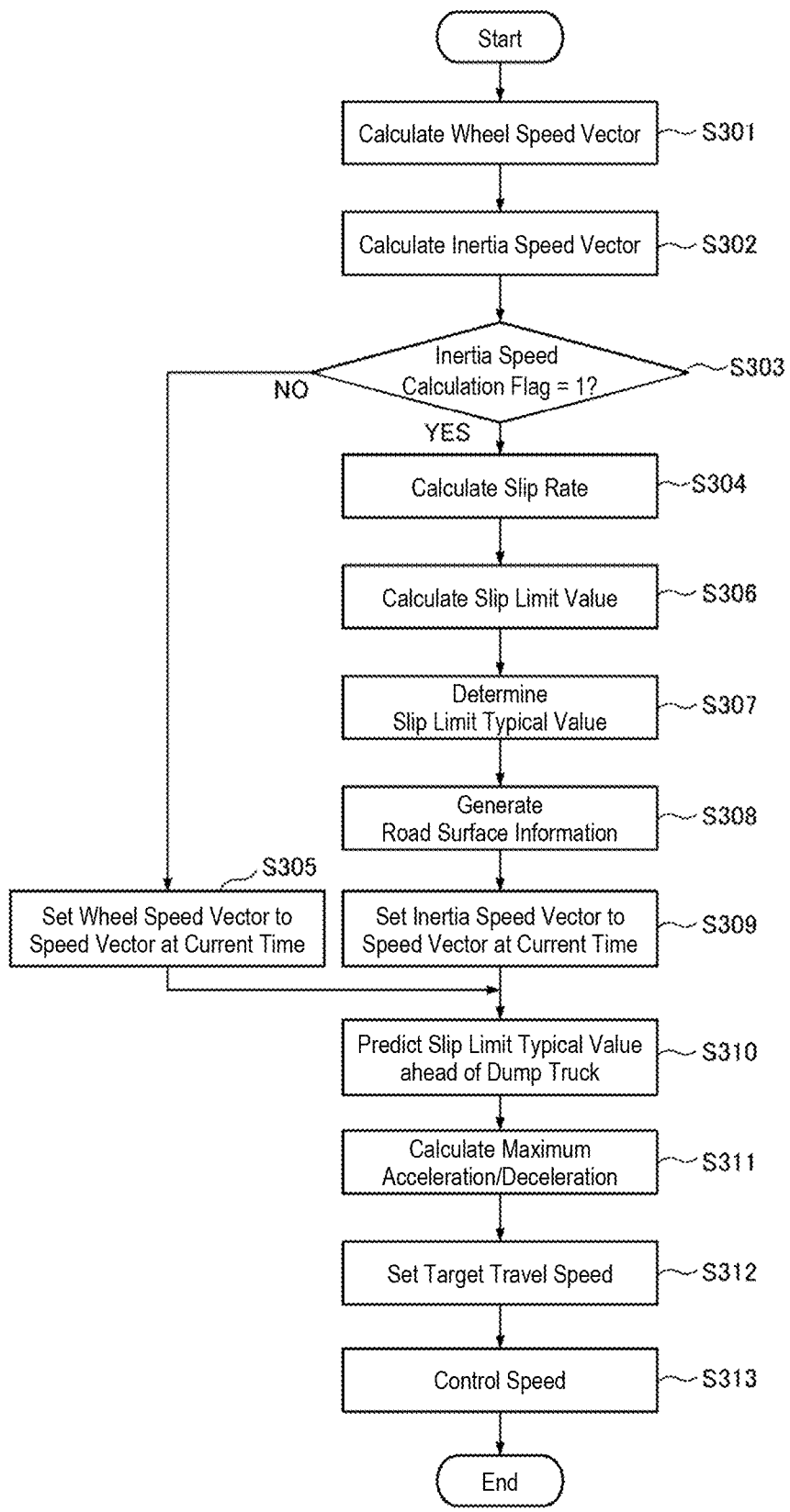
FIG. 3 is a drawing illustrating a process flow of the dump truck according to the first embodiment of the present invention.
Figure 4:
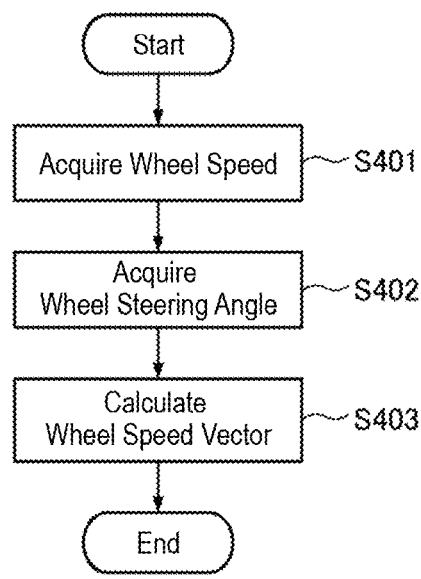
FIG. 4 is a drawing illustrating a wheel speed vector calculation flow.

The following describes in detail a method of calculating a maximum acceleration/deceleration of the dump truck 100 from the ease of slipping on a road surface and controlling the travel so as not to exceed this maximum acceleration/deceleration according to a flow illustrated in FIG. 3.

In Step S301, a wheel speed vector is calculated. The wheel speed vector can be calculated by, for example, a flow illustrated in FIG. 4. In Step S401, the wheel speed sensor 204 acquires a wheel speed (advance speed of the wheel 103 against a road surface) from the rotation speed of any one of right or left driven wheels (front wheels 103a). In Step S402, the steering angle sensor 205 acquires a steering angle that is an inclination of the driven wheels (front wheels 103a) with respect to the vehicle body front-rear direction. In Step S403, the wheel speed vector calculator 303 calculates a wheel speed vector from the wheel speed and the steering angle. When the wheel speed is denoted as v and the steering angle is denoted as S, the wheel speed vector is represented by the following Formula (1) on the vehicle body coordinate system b.

[Math. 1]

$$v_{wx} = v \cos \delta, v_{wy} = v \sin \delta \qquad (1)$$

Thus, in this embodiment, the wheel speed vector is calculated from any one of the right or left front wheels 103a that are the driven wheels. Since a torque applied to the driven wheels (front wheels 103a) is small compared with driving wheels (rear wheels 103b), a slip rate can be detected with high accuracy. The calculation of the wheel speed vector is not limited to the method of this embodiment, and the wheel speed vector may be calculated using another wheel 103 or a plurality of the wheels 103. In any case, obtained effects are the same.

In Step S302 (see FIG. 3), an inertia speed vector is calculated. The inertia speed vector can be calculated from a speed of the vehicle body 101 output from the GNSS receiver 202 and an acceleration of the vehicle body 101 output from the inertia sensor 203. The speed of the vehicle body 101 output from the GNSS receiver 202 is output at a constant cycle as a speed direction in the global coordinate system e. In this embodiment, the output cycle of the GNSS receiver 202 is longer than an output cycle of the inertia sensor 203, and the output cycle of the inertia sensor 203 is the same as an output cycle of the vehicle control device 300.

Figure 5:
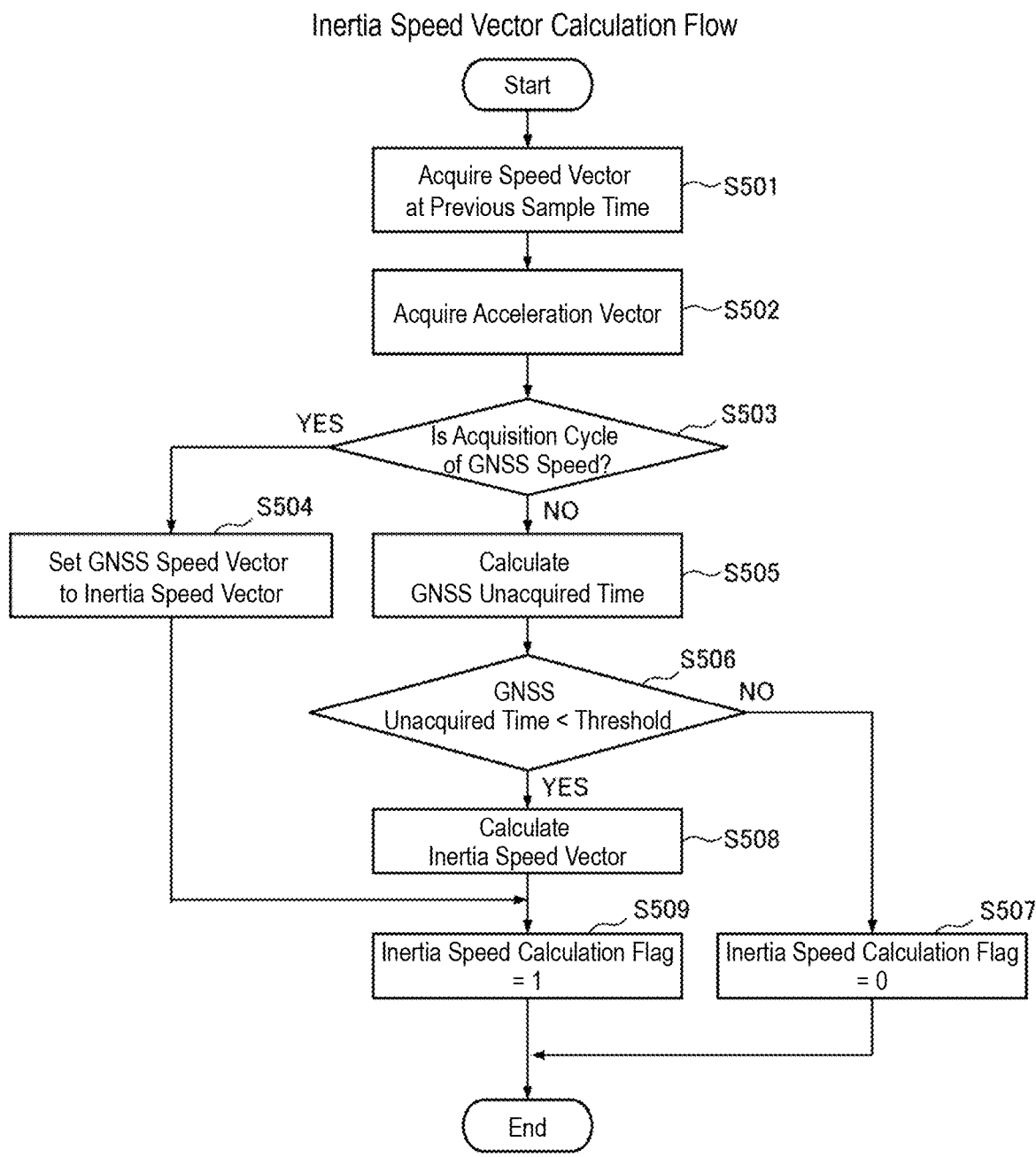
FIG. 5 is a drawing illustrating an inertia speed vector calculation flow.

FIG. 5 illustrates a calculation flow of the inertia speed vector. In Step S501, the inertia speed vector calculator 301 acquires a speed vector, the inertia speed vector or the wheel speed vector, at a previous sample time stored in the temporary storage unit 327. In Step S502, the inertia sensor 203 acquires an acceleration vector. In Step S503, the inertia speed vector calculator 301 judges whether or not to be in an acquisition cycle of a GNSS speed (speed that the GNSS receiver 202 outputs). In the case of being in the acquisition cycle of the GNSS speed, the process transitions to Step S504. The inertia speed vector calculator 301 converts a GNSS speed vector into the vehicle body coordinate system b and sets the GNSS speed vector as an inertia speed vector $v_i$, and the process transitions to step S509.

Here, when the GNSS speed vector is denoted as V, a coordinate transformation matrix from the vehicle body coordinate system b to the global coordinate system e is denoted as $C_{eb}$, a roll angle obtained from the vehicle body posture sensor 208 is denoted as $\psi$, a pitch angle is denoted as $\varphi$, and a yaw angle is denoted as $\theta$, the inertia speed vector $v_i$ is represented by the following Formula (2) and the coordinate transformation matrix $C_{eb}$ is represented by the following Formula (3).

[Math. 2]
$$v_i = C_{eb}^t V \quad (2)$$

[Math. 3]
$$C_{eb} = \begin{pmatrix} \cos\theta\cos\phi & \sin\theta\cos\phi & -\sin\phi \\ -\sin\theta\cos\psi + \cos\theta\sin\phi\sin\psi & \cos\theta\cos\psi + \sin\theta\sin\phi\sin\psi & \cos\phi\sin\psi \\ \sin\theta\sin\psi + \cos\theta\sin\phi\cos\psi & -\cos\theta\sin\psi + \sin\theta\sin\phi\cos\psi & \cos\phi\cos\psi \end{pmatrix} \quad (3)$$

On the other hand, in a case of not being in the acquisition cycle of the GNSS speed, the inertia speed vector calculator 301 calculates the inertia speed vector at a current time by integrating the acceleration vector that the inertia sensor 203 outputs with the speed vector at the previous sample time. However, an error of the speed vector calculated by the integration of the acceleration vector increases as an integration time (the number of integrations) increases. In view of this, in order to avoid the error excessively increasing, only in a case where an unacquired time (integration time of the acceleration vector) of the GNSS speed is less than a threshold, the inertia speed vector at the current time is calculated by integrating the acceleration vector with the speed vector at the previous sample time.

Specifically, in the case of not being in the acquisition cycle of the GNSS speed, the process transitions from Step S503 to Step S505, and the inertia speed vector calculator 301 calculates the unacquired time of the GNSS speed from the difference between the last time when the GNSS speed was acquired and the current time. In Step S506, the inertia speed vector calculator 301 judges whether or not the unacquired time is less than the threshold. In a case where the unacquired time is equal to or more than the threshold, the process transitions to Step S507 to set an inertia speed calculation flag to "0 (impossible to calculate)."

On the other hand, in the case where the unacquired time is less than the threshold, the process transitions to Step S508 to calculate the inertia speed vector at the current time by integrating the acceleration vector acquired in Step S502 with the speed vector at the previous sample time. When the acceleration vector is denoted as a and a unit time is denoted as dt, the speed at the current time is calculated by the following Formula (4).

[Math. 4]
$$v_i(t) = v_i(t-1) + a(t)dt \quad (4)$$

In Step S509, the inertia speed calculation flag is set to "1 (possible to calculate)" to end the calculation process of the inertia speed vector.

Next, in Step S303, whether the inertia speed calculation flag is "1 (possible to calculate)" is judged. In a case where the inertia speed calculation flag is not "1 (possible to calculate)," the process transitions to Step S305. In this case, since the inertia speed calculation flag is "0 (impossible to calculate)" and the inertia speed vector is in a situation of having a poor accuracy, the wheel speed vector is set to the speed vector at the current time.

On the other hand, in the case where the inertia speed calculation flag is "1 (possible to calculate)," the process transitions to Step S304 to calculate a slip rate of the wheels 103 against the road surface. The slip rate can be calculated by a flow illustrated in FIG. 6A.

In Step S601, the slip rate calculator 305 acquires the wheel speed vector calculated in Step S301 and the inertia speed vector calculated in Step S302. In Step S602, the slip rate calculator 305 calculates the slip rate from the wheel speed vector and the inertia speed vector. A slip rate $\lambda$ is calculated by the following Formula (5).

[Math. 5]
$$\lambda = \frac{|(v_i)| - |(v_{wx}, v_{wy})|}{|v_i|} \quad (5)$$

In Step S306, the slip limit value calculator 307 calculates a slip limit value. Here, the slip limit value is a friction coefficient value between the road surface and the wheels 103 at the boundary where the grip state of wheels in a vehicle that travels with the wheels is switched to the slip state. When the friction coefficient value between the road surface and the wheels 103 exceeds the slip limit value, travel control of the vehicle becomes difficult.

The slip limit value can be easily calculated in a case where the friction coefficient value between the road surface and the wheels 103 is identified. However, since the friction coefficient value generally changes according to the weight of the vehicle, the road surface condition (such as gradient, water content, and soil property), and the acceleration/deceleration of the vehicle, the slip limit value also changes. Therefore, in this embodiment, using the fact that the slip rate and the friction coefficient value are approximately proportional in the grip state as long as the road surface condition (such as gradient, water content, and soil property) is constant, the slip limit value is calculated in the following manner.

Figure 6A:
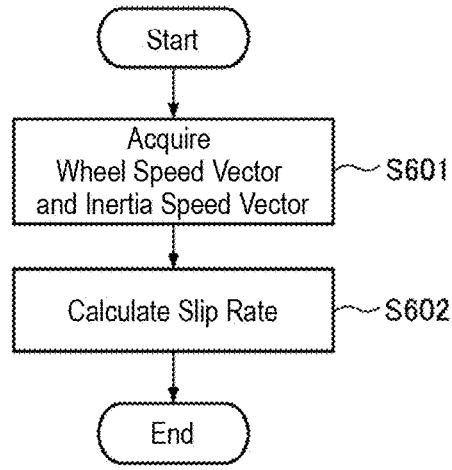
FIG. 6A is a drawing illustrating a slip rate calculation flow.
Figure 6B:
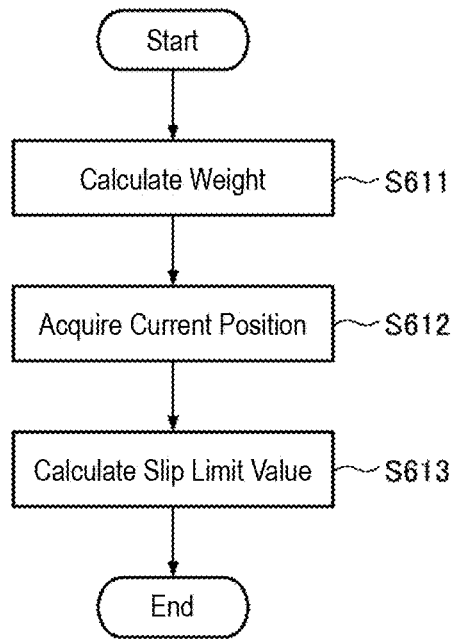
FIG. 6B is a drawing illustrating a slip limit value calculation flow.

As illustrated in FIG. 6B, in Step S611, a load that each wheel 103 applies to the road surface is calculated. Specifically, a weight applied to each wheel 103 is calculated by acquiring a load weight from the load sensor 206 and dividing the acquired weight to which a preset vehicle weight is added by the number of the wheels 103. The weight applied to each wheel 103 may be calculated from a measurement result of the suspension pressure sensor 207.

In Step S612, position information output from the GNSS receiver 202 is acquired.

In Step S613, the slip limit value is calculated. The weight calculated in Step S611 is denoted as M, a gravitation acceleration is denoted as g, a vehicle speed is denoted as v, the acceleration/deceleration of the vehicle is denoted as a, an air viscosity coefficient is denoted as b, and a rolling resistance coefficient is denoted as c. The slip rate at the boundary of the grip state and the slip state is denoted as Λ. The slip rate Λ is generally about 0.2. After an estimated friction coefficient is calculated using the following Formula (6) as an equation of motion, a slip limit value $\mu_{lim}$ is calculated further using the following Formula (7). The calculated slip limit value $\mu_{lim}$ is stored in the temporary storage unit 327.

[Math. 6]
$$\alpha = \mu g - cg - \frac{b}{M}v^2 \quad (6)$$

[Math. 7]
$$\mu_{lim} = \Lambda \frac{\mu}{\lambda} \quad (7)$$

Here, while the example in which the estimated friction coefficient is calculated using the weight M, the vehicle speed v, the air viscosity coefficient b, and the rolling resistance coefficient c is shown, the estimated friction coefficient may be calculated using the following Formula (6)' instead of the above-described Formula (6). However, using the above-described Formula (6), the slip limit value $\mu_{lim}$ can be calculated more accurately.

[Math. 8]
$$\alpha = \mu g \quad (6),$$

In Step S307, the slip limit typical value determining unit (hereinafter, also referred to as a typical value determining unit) 311 determines a typical value of the slip limit value. The slip limit value calculated in Step S306 is a measured instantaneous value at each measurement position. However, since the slip limit value is calculated using measured values, such as the vehicle weight, the acceleration/deceleration and the speed of the vehicle, and the like, an error occurs. Although it is possible to directly use this slip limit value to calculate a maximum acceleration/deceleration (the upper limit value of an acceleration and the upper limit value of a deceleration) as described later and set a target travel speed, in this case, the target travel speed at each measurement position is in a state of including the error. In view of this, since the target travel speed changes for each measurement position, it is necessary to change the speed of the vehicle frequently.

Therefore, in this embodiment, a travel route of the vehicle is separated into a plurality of measurement sections, and assuming that the friction coefficient value between the road surface and the wheels 103 is constant within each of the measurement sections, the slip limit typical value (hereinafter, also referred to as a typical value) at each of the measurement sections is determined. Then, the determined typical value is used as the slip limit value at each of the measurement sections.

FIG. 7 illustrates a determination flow of the slip limit typical value. In Step S701, measurement information of the dump truck 100 is acquired. The measurement information includes the measurement position, the acceleration/deceleration, the vehicle weight, and the slip limit value. The acquired measurement information is stored in the temporary storage unit 327 as a measurement information table illustrated in FIG. 8.

Figure 9:
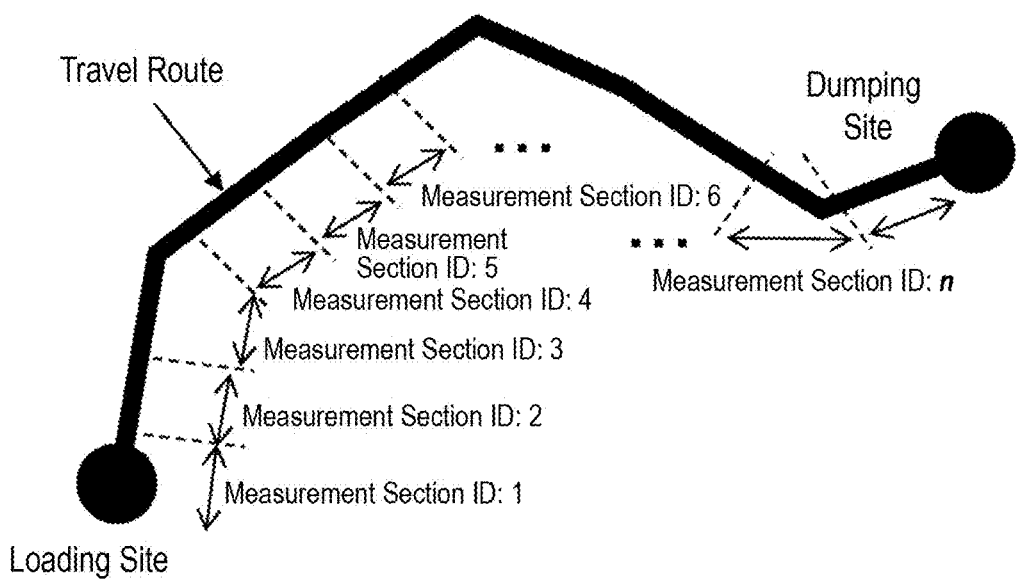
FIG. 9 is a drawing illustrating a state in which a travel route is divided into a plurality of measurement sections.

In Step S702, measurement section information is stored in the temporary storage unit 327. Here, the measurement sections are a plurality of sections into which the travel route of the dump truck 100 is divided and are divided by range where the slip limit value can be regarded as being approximately constant. FIG. 9 illustrates one example of a conveyance route (travel route) from a loading site to a dumping site and the travel route is divided into a plurality of sections. A determination method of a length of each of the measurement sections is not particularly limited. For example, the length of each of the measurement sections may be determined by multiplying a limiting speed of a corresponding section preset in the mine map data by a predetermined time. In a case where a point at which the slip limit value is easy to change on the travel route is known in advance, the measurement section may be divided at the point. In FIG. 9, although the travel route is divided over the whole region, only regions where accelerating/decelerating is required (for example, around a corner, around the loading site and the dumping site) may be divided.

The measurement section information includes the slip limit values, the accelerations/decelerations, the vehicle weights, and a time corresponding to the above-described measurement sections (ID) and is stored in the temporary storage unit 327 as a measurement section information table illustrated in FIG. 10.

In Step S703, a road surface condition flag is acquired from the slip limit typical value storage unit (hereinafter, also referred to as a typical value storage unit) 313. In the typical value storage unit 313, as illustrated in FIG. 11, a measurement section table including a starting point position, an ending point position, a gradient, a curvature radius, a slip limit typical value, and a road surface condition flag that correspond to each of the measurement sections (ID) is stored. The road surface condition flag is defined as "Normal (1)" in a case where a past road surface condition (here, the slip limit typical value) is maintained and as "Change (0)" in a case where the road surface condition is changed.

In Step S704, whether or not the past road surface condition is maintained is judged. Specifically, whether or not the number of the road surface condition flags being "Normal (1)" is equal to or more than a threshold is judged.

In a case where the number of the road surface condition flags being "Normal (1)" is less than the threshold, it means that the road surface condition entirely has changed by, for example, a rainfall and the like. In this case, the process transitions to Step S707 to reset the slip limit typical value stored in the typical value storage unit 313 and return to an initial value. The initial value of the slip limit typical value is a predetermined friction coefficient value that is small enough not to become impossible to control when the dump truck 100 is decelerated at a lowest deceleration. As the initial value of the slip limit typical value, for example, a friction coefficient value between a road surface that becomes easy to slip by sprinkling water on sand and the wheels 103 may be used.

On the other hand, in a case where the number of the road surface condition flags being "Normal (1)" is equal to or more than the threshold, it means that the road surface condition has not changed. In this case, the process transitions to Step S705 to acquire the slip limit values from the temporary storage unit 327.

Figure 12:
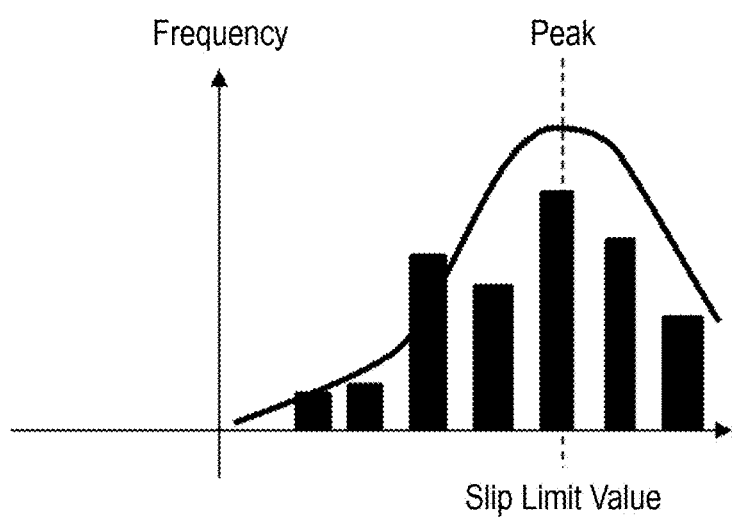
FIG. 12 is a drawing illustrating one example of a slip limit value in a certain measurement section and the frequency of the slip limit value.

In Step S706, the slip limit typical value is determined (updated) using a plurality of slip limit values at each of the measurement sections. Various methods are considered as a method of determining the slip limit typical value. For example, as illustrated in FIG. 12, a histogram of the slip limit values at a certain measurement section acquired in Step S705 may be created and its peak may be defined as the slip limit typical value. The slip limit value that is a friction coefficient value has, as described above, variation generated due to a measurement error and the like. In view of this, although, as illustrated in FIG. 12, a multimodal histogram is created in some cases, the easiest method is that it is only necessary to define a median of bins having the highest frequency as the slip limit typical value. As illustrated by a solid line in FIG. 12, the frequency may be fitted to a normal distribution, and the friction coefficient value that becomes its peak may be calculated and defined as the slip limit typical value. An average of the slip limit values may be calculated and defined as the slip limit typical value.

In Step S308, road surface information on each of the measurement sections is generated. As illustrated in FIG. 13, the road surface information is a table in which the slip limit typical values and the road surface condition flag at each of the measurement sections are set. In the road surface information, a predetermined number (here, k steps) of slip limit typical values for each of the measurement sections are included. For each of the measurement sections, the road surface condition flag is set from the plurality of slip limit typical values. The road surface information can be generated by, for example, a flow illustrated in FIG. 14.

Figure 14:
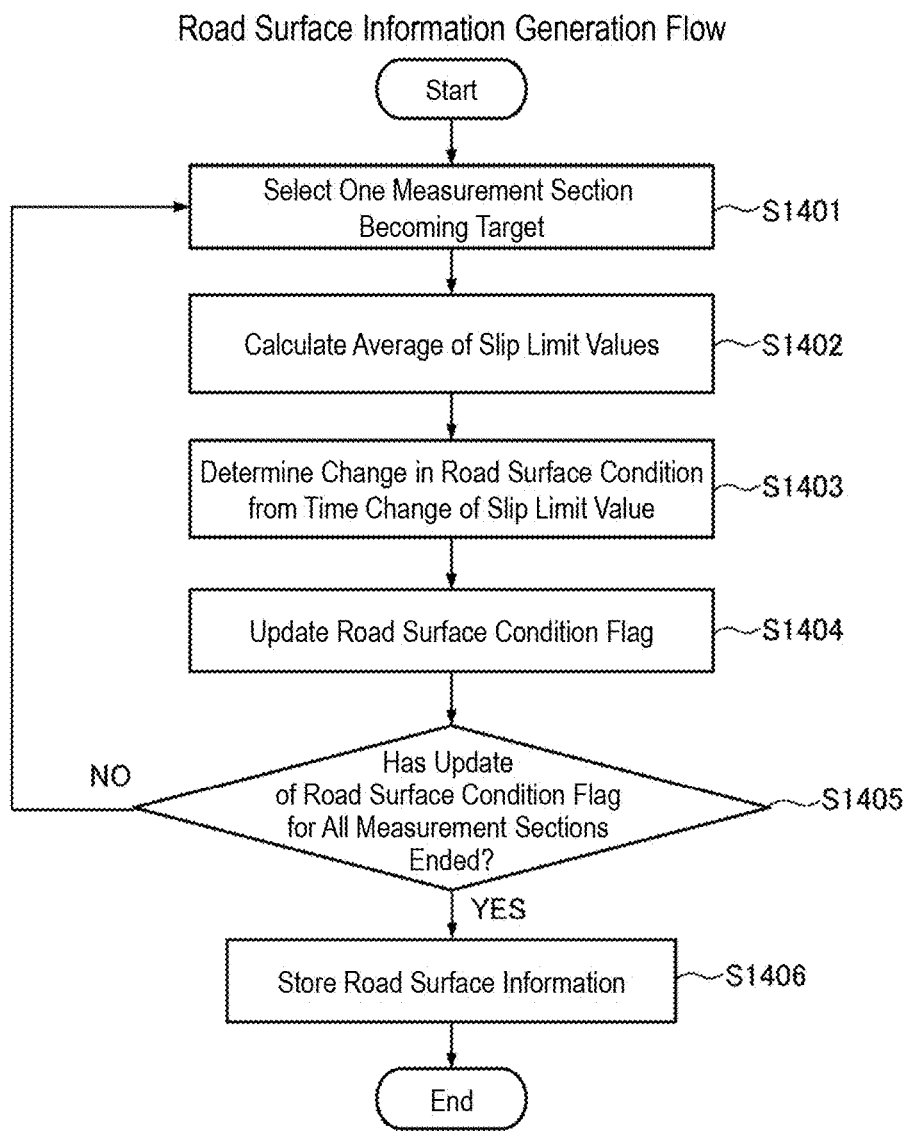
FIG. 14 is a drawing illustrating a road surface information generation flow.

As illustrated in FIG. 14, in Step S1401, one measurement section becoming a target is selected. In Step S1402, an average of the slip limit values (hereinafter, also referred to as an average slip limit value) in the measurement section selected in Step S1401 is calculated. When the average slip limit value is denoted as $\mu_{ave}$, the latest slip limit typical value in all the measurement sections is denoted as $\mu_{lim}i(0)$, and the number of the measurement sections is denoted as m, the average slip limit value $\mu_{ave}$ is calculated by the following Formula (8). However, the number of the measurement sections m is reset to zero times when the road surface condition flag is changed.

[Math. 9]

$$\mu_{ave} = \frac{\sum_{i=1}^{m} \mu_{lim}i(0)}{m} \tag{8}$$

Figure 15:
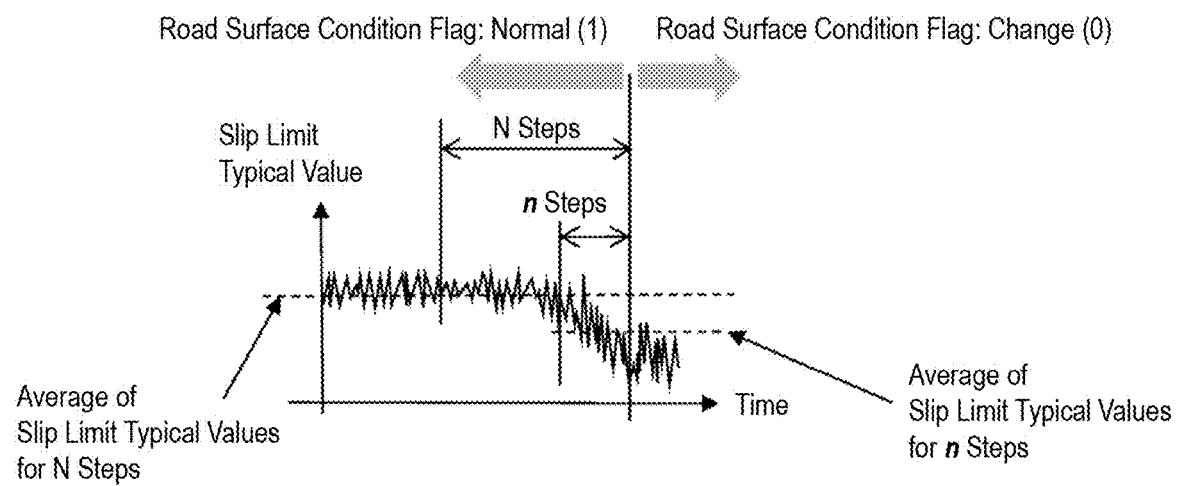
FIG. 15 is a schematic diagram for describing a method of determining a change in a road surface condition from a time change of the slip limit value.

Next, in Step S1403, a change in the road surface condition is determined from a time change of the slip limit value (change due to the slip limit value being updated) of the measurement section becoming the target. While various kinds of methods are considered for the determination method of the change in the road surface condition, here, the simplest determination method is indicated. FIG. 15 illustrates a schematic diagram for determining the change in the road surface condition from the time change of the slip limit value.

First, the difference between an average of the slip limit typical values (hereinafter, also referred to as an average slip limit typical value) for past N unit times (however, N<k) and the average slip limit value calculated in Step S1402 is calculated by the following Formula (9).

[Math. 10]

$$\delta\mu_N = \left| \frac{\sum_{i=0}^{N} \mu_{lim}^{(i)}}{N} - \mu_{ave}(t) \right| \tag{9}$$

Next, the difference between the average slip limit typical value for the past N unit times (however, N<k) and an average slip limit typical value for past n unit times (however, n<N/2) is calculated by the following Formula (10).

[Math. 11]

$$\delta\mu_n = \left| \frac{\sum_{i=0}^{N} \mu_{lim}^{(i)}}{n} - \frac{\sum_{i=0}^{N} \mu_{lim}^{(i)}}{N} \right| \tag{10}$$

In a case where any of differences $\delta\mu_N$ or $\delta\mu_n$ exceeds a threshold, the road surface condition is judged to have changed, and in a case where any of the differences $\delta\mu_N$ or $\delta\mu_n$ does not exceed the threshold, the road surface condition is judged not to have changed. Needless to say, a method of determining the change in the road surface condition is not limited to the method using the above-described Formulas (9) and (10), and various other kinds of methods can be used.

In Step S1404, the road surface condition flag is updated from the determination result of Step S1403. In Step S1405, whether or not the road surface condition flag has been updated for all the measurement sections is judged. In a case where the road surface condition flag has not been updated for all the measurement sections, the process returns to Step S1401 to select a next measurement section, and Step S1402 to Step S1405 are repeated. In a case where the road surface condition flag has been updated for all the measurement sections, the process transitions to Step S1406 to store the road surface information in the road surface information storage unit 318.

After the generation process of the road surface information ends, in Step S309, the inertia speed vector is set to the speed vector at the current time.

In Step S310, a road surface condition (here, a slip limit typical value) ahead of the dump truck 100 is predicted. Since the road surface condition ahead (on a planned travel route) of the dump truck 100 has possibly changed, the road surface condition is predicted using the above-described road surface condition flag.

Figure 16:
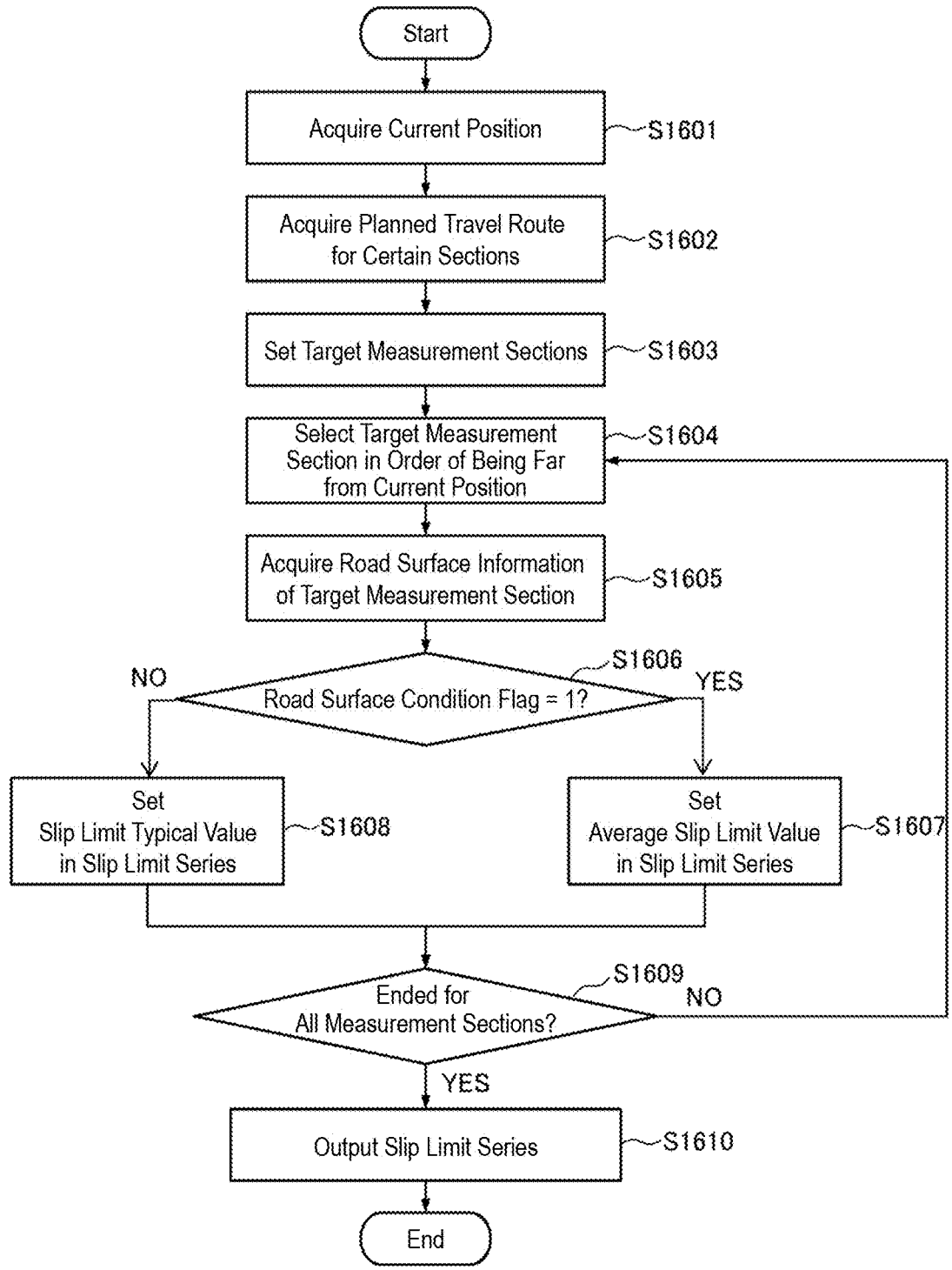
FIG. 16 is a drawing illustrating a prediction flow of a road surface condition ahead of the dump truck.

FIG. 16 illustrates a prediction flow of the road surface condition ahead of the dump truck 100. In Step S1601, a current position of the dump truck 100 is acquired from an output of the GNSS receiver 202. In Step S1602, the planned travel route is acquired from the current position to a target position. Specifically, by the travel route generating unit 317, using mine map data in which all travel route data in the mine is stored, the planned travel route from the current position to the target position is generated. Here, the target position is a point that is away from the current position by a distance that allows the dump truck 100 to stop without becoming in a state where braking is impossible (slip state) when the dump truck 100 decelerates at the lowest deceleration. Examples of the target position include, for example, a loading site, a dumping site, or a change point (such as a corner) of a limiting speed that is set on a mine map. The target position is set such that a change point of the limiting speed does not exist between the current position and the target position. The target position may be set such that a change point of the limiting speed exists between the current position and the target position.

In Step S1603, the measurement sections included in the planned travel route among all the measurement sections are set as target measurement sections and the target measurement sections are rearranged in an order of being far from the current position. In Step S1604, among all the target measurement sections, a target measurement section is selected in the order of being far from the current position. In Step S1605, the slip limit typical value, the road surface condition flag, and the average slip limit value, which are the road surface information of the target measurement section selected in Step S1604 is acquired (read out) from the road surface information storage unit 318.

In Step S1606, whether or not the road surface condition flag of the target measurement section selected in Step S1604 is "Normal (1)" is judged. In a case where the road surface condition flag is "Normal (1)," the process transitions to Step S1607 to set the average slip limit value for the target measurement section among a slip limit series illustrated in FIG. 17. The slip limit series is a table that associates the target measurement sections from the current position to the target position with the slip limit values that are set for the respective target measurement sections. On the other hand, in a case where the road surface condition flag is "Change (0)," the process transitions to Step S1608 to set the slip limit typical value for the target measurement section among the slip limit series. That is, in the case where the road surface condition flag is "Change (0)," the initial value of the slip limit typical value that is set in the above-described step S707 is set for the target measurement section.

In Step S1609, whether or not the process from Step S1604 to Step S1608 has ended for all the target measurement sections is judged. In a case where the process has not ended for all the target measurement sections, the process returns to Step S1604, and the process from Step S1604 to Step S1608 is repeated. In a case where the process has ended for all the target measurement sections, the process transitions to Step S1610 to output the slip limit series to the maximum acceleration/deceleration calculator 321.

In Step S311, a maximum acceleration/deceleration of the dump truck 100 is calculated from the slip limit series. The maximum acceleration/deceleration is the upper limit value of an acceleration and the upper limit value of a deceleration at which the dump truck 100 can maintain the grip state.

Figure 18:
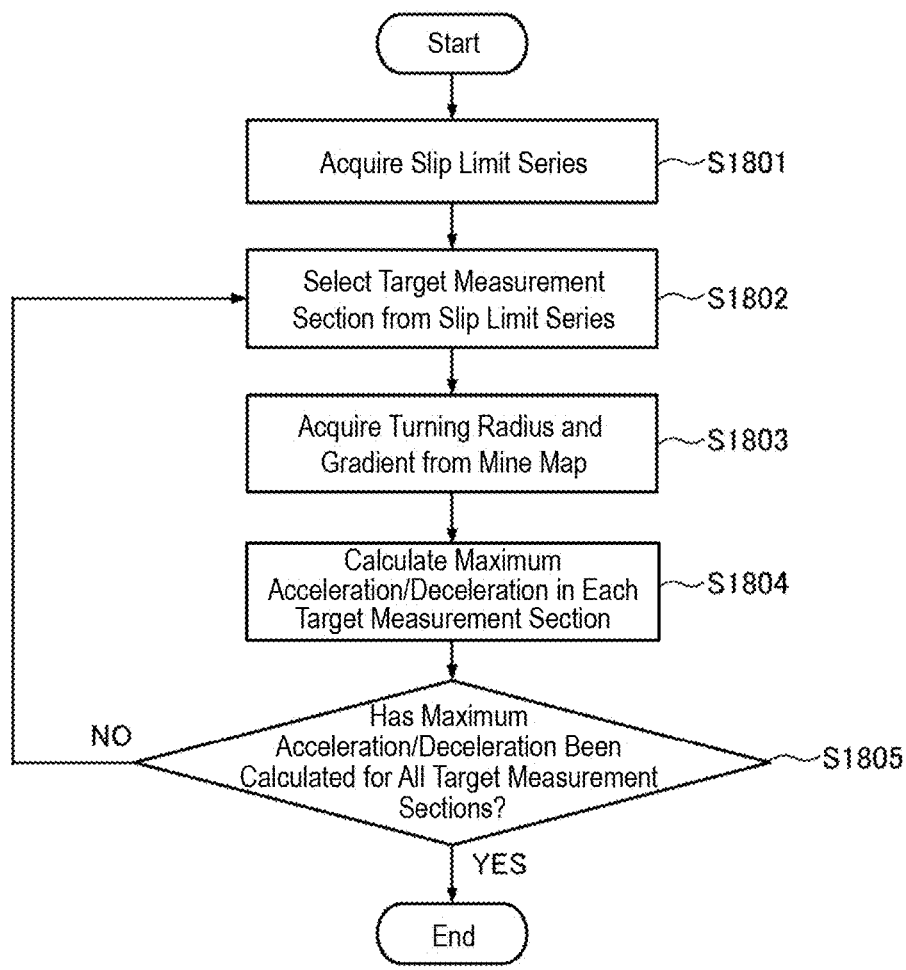
FIG. 18 is a drawing illustrating a maximum acceleration/deceleration calculation flow.

FIG. 18 illustrates a calculation flow of the maximum acceleration/deceleration of the dump truck 100. In Step S1801, the slip limit series generated in Step S310 is acquired. In Step S1802, one target measurement section among the slip limit series is selected. In Step S1803, a turning radius (curvature radius) and a gradient in the selected target measurement section is acquired from the mine map.

In Step S1804, a maximum acceleration/deceleration of the dump truck 100 in the selected target measurement section is calculated. When the maximum acceleration/deceleration is denoted as $\alpha_{max}$, the slip limit value in each of the target measurement sections is denoted as $\mu_{lim}'$, the gradient and the turning radius acquired in Step S1803 are respectively denoted as $\varphi$ and r, the gravitation acceleration is denoted as g, and the limiting speed of the planned travel route (upper limit of the vehicle speed preset in the mine map data) is denoted as $v_{max}$, the maximum acceleration/deceleration $\alpha_{max}$ is calculated by the following Formula (11).

[Math. 12]

$$\alpha_{max} = \mu_{lim}' \cdot g\cos\varphi + \frac{v_{max}^2}{r} \tag{11}$$

By denoting the weight calculated in Step S303 as M, the air viscosity coefficient as b, and the rolling resistance coefficient as c, and using the following Formula (11)', the maximum acceleration/deceleration $\alpha_{max}$ may be calculated. In this case, the maximum acceleration/deceleration $\alpha_{max}$ can be calculated more accurately.

[Math. 13]

$$\alpha_{max} = \mu_{lim}' \cdot g\cos\varphi - cg - \frac{b}{M}v_{max}^2 + \frac{v_{max}^2}{r} \tag{11}'$$

The calculated maximum acceleration/deceleration $\alpha_{max}$ is set for the target measurement section among a maximum acceleration/deceleration series illustrated in FIG. 19. The maximum acceleration/deceleration series is a table that associates the target measurement sections from the current position to the target position with the maximum accelerations/decelerations that are set in the respective target measurement sections.

In Step S1805, whether or not the maximum acceleration/deceleration has been calculated for all the target measurement sections is judged. In a case where the maximum acceleration/deceleration has not been calculated for all the target measurement sections, the process returns to Step S1802, and the process from Step S1802 to Step S1804 is repeated. In a case where the maximum acceleration/deceleration has been calculated for all the target measurement sections, the calculation process of the maximum acceleration/deceleration ends.

In Step S312, a target travel speed of the dump truck 100 at each position is set from the maximum acceleration/deceleration series. The target travel speed is a highest travel speed for the dump truck 100 to reach a target position at a predetermined target speed while maintaining the grip state. For example, in a case where the dump truck 100 stops at a dumping site (target position), the target travel speed is set low at a position near the dumping site and the target travel speed is set high at a position far from the dumping site. The target travel speed is set so as to allow the dump truck 100 to stop at the dumping site while maintaining the grip state at the time when the dump truck 100 decelerates as approaching the dumping site and to become a travel speed as fast as possible.

Figure 20:
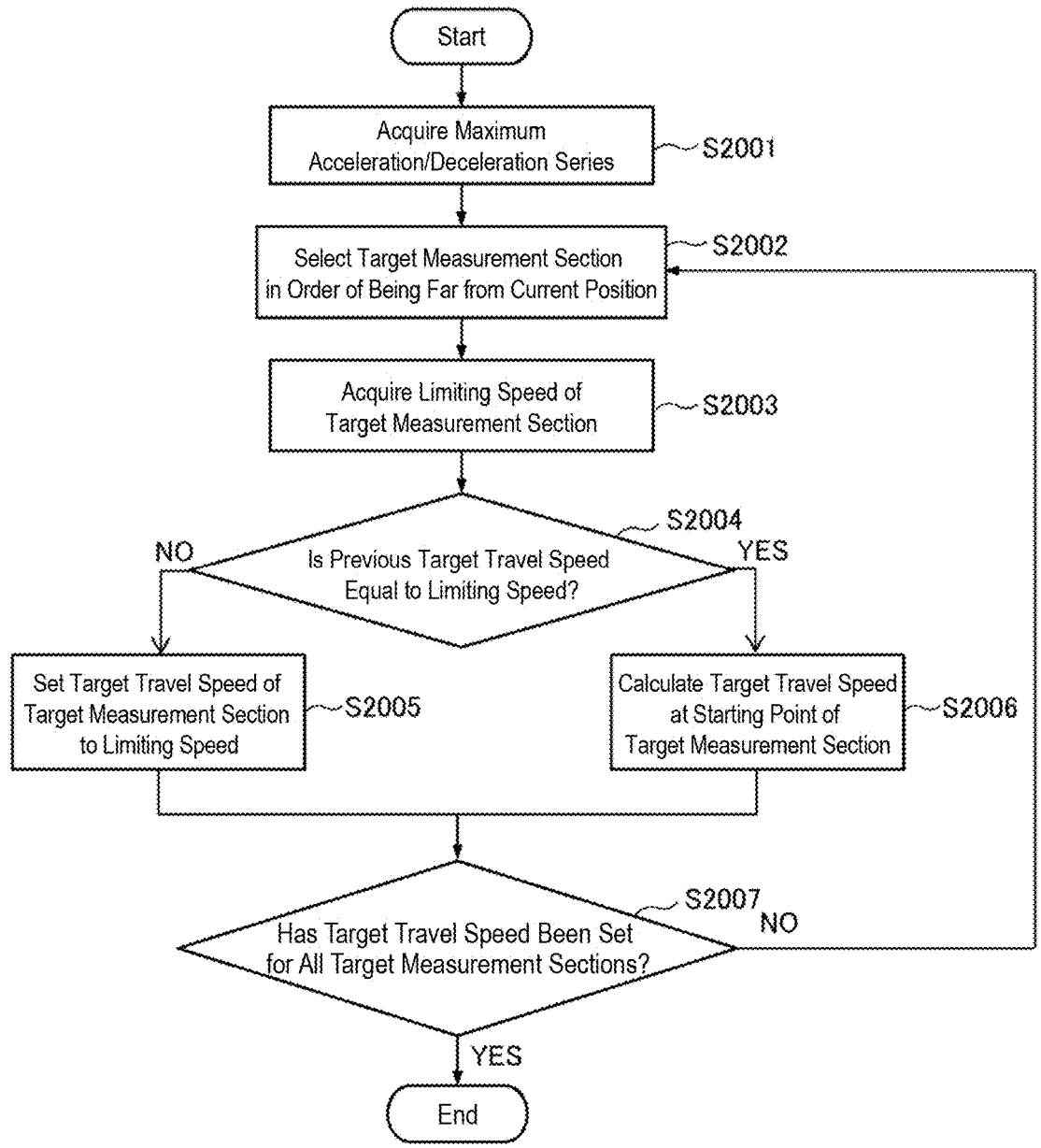
FIG. 20 is a drawing illustrating a target travel speed setting flow.

FIG. 20 illustrates a setting flow of the target travel speed of the dump truck 100. In Step S2001, the maximum acceleration/deceleration series that is set in Step S311 is acquired. In Step S2002, a target measurement section is selected in the order of being far from the current position of the dump truck 100. In Step S2003, for the selected target measurement section, the limiting speed that is set in the mine map is acquired.

In Step S2004, in a case where the target travel speed at a starting point (position close to the dump truck 100) of the previously selected target measurement section has been calculated, whether or not the target travel speed is equal to or more than the limiting speed acquired in Step S2003 is judged. However, since the target travel speed does not exceed the limiting speed, whether or not the target travel speed is equal to the limiting speed is judged. In a case where the target travel speed is equal to the limiting speed, the process transitions to Step S2005. Then, in Step S2005, for the target measurement section among a target travel speed series illustrated in FIG. 21, the target travel speed is set to the limiting speed. The target travel speed series is a table that associates the target measurement sections from the current position to the target position with the target travel speeds that are set for the respective target measurement sections.

On the other hand, in a case where the target travel speed is lower than the limiting speed, the process transitions to Step S2006. Then, from the target travel speed at an ending point of the target measurement section (starting point of the previously selected target measurement section) and the maximum acceleration/deceleration of the target measurement section, in order for the dump truck 100 to be able to reach the ending point of the target measurement section at the target travel speed while maintaining a state where braking is possible (grip state), the target travel speed at a starting point of the target measurement section is calculated and set in the target travel speed series. The target travel speed may be set not only at the starting point of the target measurement section, but also at each section.

In Step S2007, whether or not the target travel speed has been set for all the target measurement sections is judged. In a case where the target travel speed has not been set for all the target measurement sections, the process returns to Step S2002, and the process from Step S2002 to Step S2006 is repeated. In a case where the target travel speed has been set for all the target measurement sections, the setting process of the target travel speed ends.

In Step S313, the speed controller 325 controls the speed of the dump truck 100. At this time, with the target travel speed in the target travel speed series generated in Step S312 as a target value, a rotation speed control and a braking control of the wheels 103 are performed.

In this embodiment, as described above, the vehicle control device 300 calculates and stores the slip limit values at a plurality of positions on the travel route, reads out the slip limit value to calculate the maximum acceleration/deceleration (here, both the maximum acceleration and the maximum deceleration) at which the wheels 103 is capable of maintaining the grip state against the road surface, and during travelling to the target position on the travel route, sets the target travel speed at the travel position between the own vehicle and the target position according to the target speed at the target position and the maximum acceleration/deceleration calculated from the slip limit value when the dump truck 100 travels at the travel position. This sets the target travel speed at each of the travel positions to the target position on the planned travel route such that the dump truck 100 accelerates at the maximum acceleration and decelerates at the maximum deceleration. In view of this, the dump truck 100 reaches the target position at a predetermined target speed in the shortest time while maintaining a state where the maximum acceleration and the maximum deceleration are not exceeded (grip state). This allows the dump truck 100 to efficiently travel while suppressing becoming uncontrollable by a slip. As a result, the dump truck 100 can achieve travelling that achieves both safety and efficiency.

As described above, the vehicle control device 300 calculates the slip rates of the wheels 103 at a plurality of positions, and from the slip rates, calculates the slip limit values at the plurality of positions. This can easily calculate the maximum acceleration/deceleration at which the wheels 103 can maintain the grip state against the road surface.

As described above, the vehicle control device 300 detects a change in slipperiness of the road surface from the time change of the slip limit value and changes the maximum acceleration/deceleration according to the change in slipperiness of the road surface. For example, in a case where the road surface becomes slippery due to a rainfall, the maximum acceleration/deceleration is changed to be low, and in a case where the road surface becomes less slippery in association with a temperature increase, drying, and the like, the maximum acceleration/deceleration is changed to be high. Since this can appropriately change the maximum acceleration/deceleration and the target travel speed in association with time passage, safer and more efficient travel can be ensured.

As described above, the slip rate is calculated using the front wheels 103a that are the driven wheels. Since a torque applied to the driven wheels (front wheels 103a) is small compared with the driving wheels (rear wheels 103b) and a slip is less likely to occur against a slippery road surface, such as an off road, compared with the driving wheels (rear wheels 103b), the slip rate can be calculated with high accuracy.

As described above, the vehicle control device 300 divides the travel route into a plurality of sections, and for each of the sections, calculates one maximum acceleration/deceleration (one maximum acceleration and one maximum deceleration) from a plurality of the slip limit values. In this embodiment, the measurement sections are divided by a range where the slip limit value can be regarded as being approximately constant, one representative slip limit typical value is calculated from the plurality of the slip limit values for each of the measurement sections, and one maximum acceleration/deceleration is set for each of the measurement sections. This can easily calculate the maximum acceleration/deceleration compared with a case where one maximum acceleration/deceleration is calculated for each slip limit value.

Since the slip limit value is calculated using measured values, such as the vehicle weight, the acceleration/deceleration and the speed of the vehicle, and the like, an error occurs. Although, unlike this embodiment, it is possible to directly use this slip limit value to calculate the maximum acceleration/deceleration and set the target travel speed, in this case, the target travel speed at each of the measurement positions is in a state of including the error. In view of this, since the target travel speed changes for each of the measurement positions, it is necessary to change the speed of the vehicle frequently. On the other hand, in this embodiment, since the representative slip limit typical value from the plurality of slip limit values is used for each of the measurement sections to calculate the maximum acceleration/deceleration and set the target travel speed, it is not necessary to change the speed of the vehicle frequently.

As described above, in a case where the vehicle control device 300 sets the target travel speeds at a plurality of travel positions between the own vehicle and the target position, the vehicle control device 300 sets the target travel speed in the order from the travel position far from the current position (close to the target position). Since this sets the target travel speed in the order from the side close to the target position, the target travel speed at each of the travel positions can be easily set so as to reach the target position in the shortest time while maintaining the grip state.

Second Embodiment

Next, with reference to FIG. 22 to FIG. 25, a speed control system 900 including the dump trucks 100 that are one example of a conveying vehicle according to the second embodiment of the present invention will be described. When a road surface condition of a travel route is detected, detecting with a plurality of dump trucks 100 is more efficient. Therefore, in the second embodiment, unlike the above-described first embodiment, a case where detection of the road surface condition is performed with a plurality of dump trucks 100 while a slip limit value calculated with each of the dump trucks 100 is transmitted to a control system 500 to generate road surface information by the control system 500 will be described. In this embodiment, the same reference numerals are designated to configurations similar to the above-described first embodiment and detailed explanations of the configurations are omitted.

Figure 22:
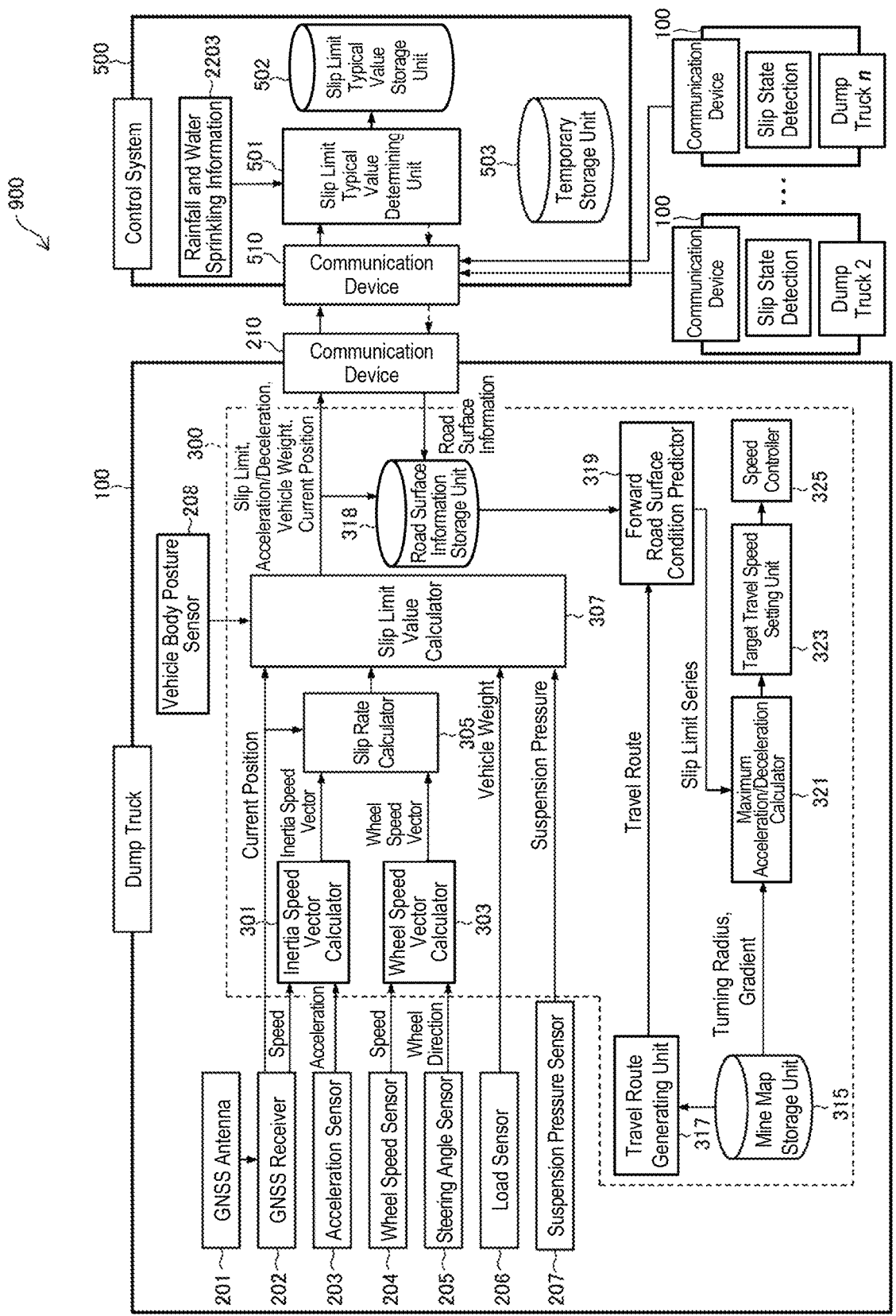
FIG. 22 is a drawing illustrating a configuration of a speed control system including dump trucks that are one example of a conveying vehicle according to a second embodiment of the present invention.

FIG. 22 is a drawing illustrating a configuration of the speed control system 900 including the dump trucks 100 that are one example of a conveying vehicle according to the second embodiment of the present invention. The speed control system 900 includes a plurality of dump trucks 100 and the control system 500 capable of communicating with each of the dump trucks 100.

In this embodiment, unlike the above-described first embodiment, instead of the slip limit typical value determining unit 311, the slip limit typical value storage unit 313, and the temporary storage unit 327 of the dump truck 100, a slip limit typical value determining unit 501, a slip limit typical value storage unit 502, and a temporary storage unit 503 are disposed in the control system 500. The slip limit typical value determining unit 501, the slip limit typical value storage unit 502, and the temporary storage unit 503 have similar functions to the slip limit typical value determining unit 311, the slip limit typical value storage unit 313, and the temporary storage unit 327, respectively.

The dump truck 100 has a communication device 210, and the control system 500 has a communication device 510 capable of communicating with the communication device 210. The plurality of dump trucks 100 all have the same configuration, and in FIG. 22, the configurations of the second and subsequent dump trucks 100 are omitted.

Figure 23:
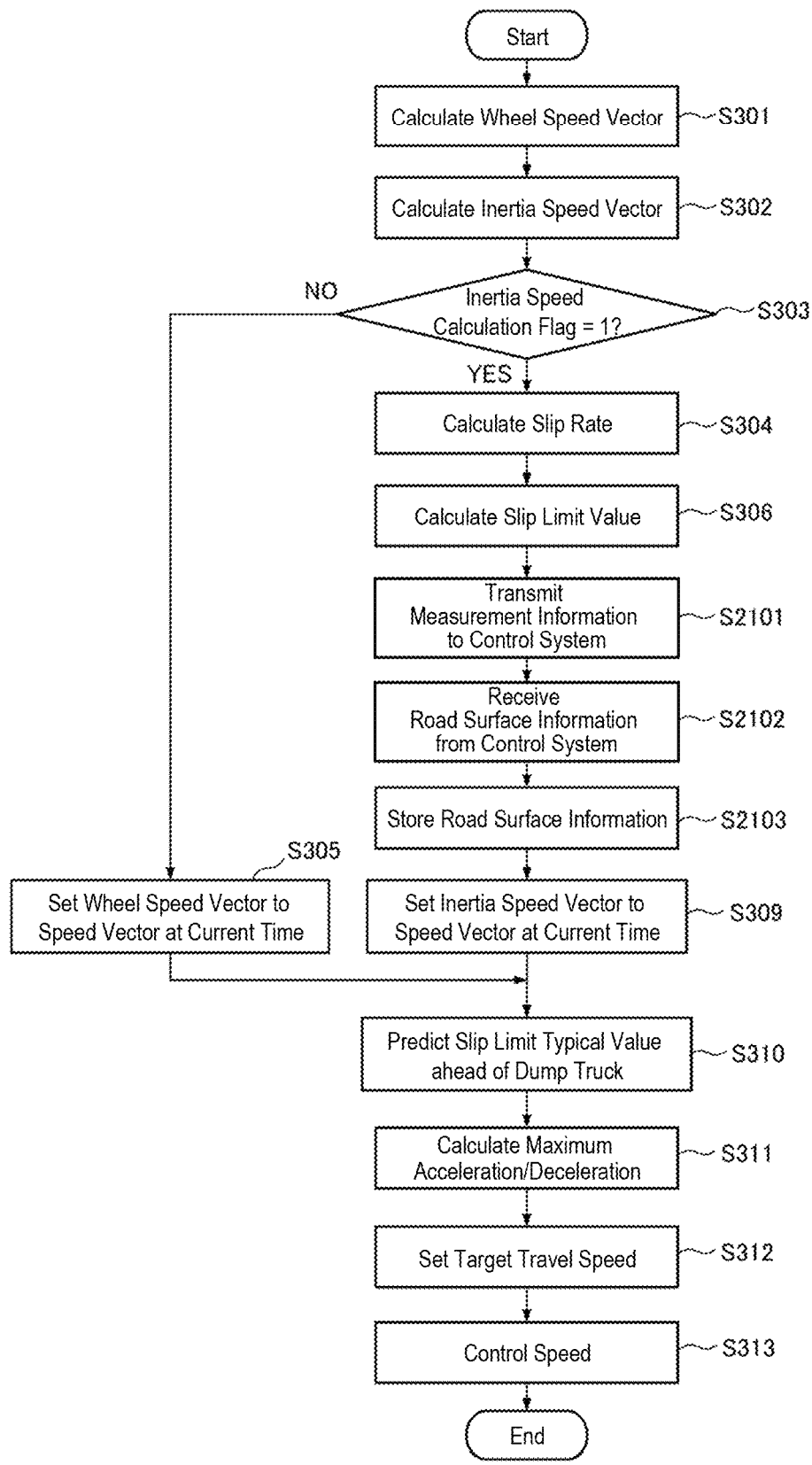
FIG. 23 is a drawing illustrating a process flow of the dump truck of the second embodiment of the present invention.

The following describes a method by which the dump truck 100 in this embodiment calculates a maximum acceleration/deceleration from the ease of slipping on a road surface and controls a speed so as not to exceed this maximum acceleration/deceleration according to a flow illustrated in FIG. 23. The similar process to FIG. 3 is designated by the reference numeral in FIG. 3.

Since the process from Step S301 to Step S306 is similar to the above-described first embodiment, the explanation is omitted. Although the data, such as the slip limit value, the acceleration/deceleration, the vehicle weight, and the current position, is stored in, for example, the road surface information storage unit 318, a temporary storage unit for storing these data may be additionally disposed. After the process of Step S306 ends, the process transitions to Step S2101.

In Step S2101, measurement information is transmitted to the control system 500. The measurement information includes the position, the acceleration/deceleration, the vehicle weight, the slip limit value, and the like of the dump truck 100. After the transmission of the measurement information ends, in Step S2102, road surface information is received from the control system 500. In Step S2103, the received road surface information is stored in the road surface information storage unit 318. Since the process from the next Step S309 to Step S313 is similar to the above-described first embodiment, the explanation is omitted.

Figure 24:
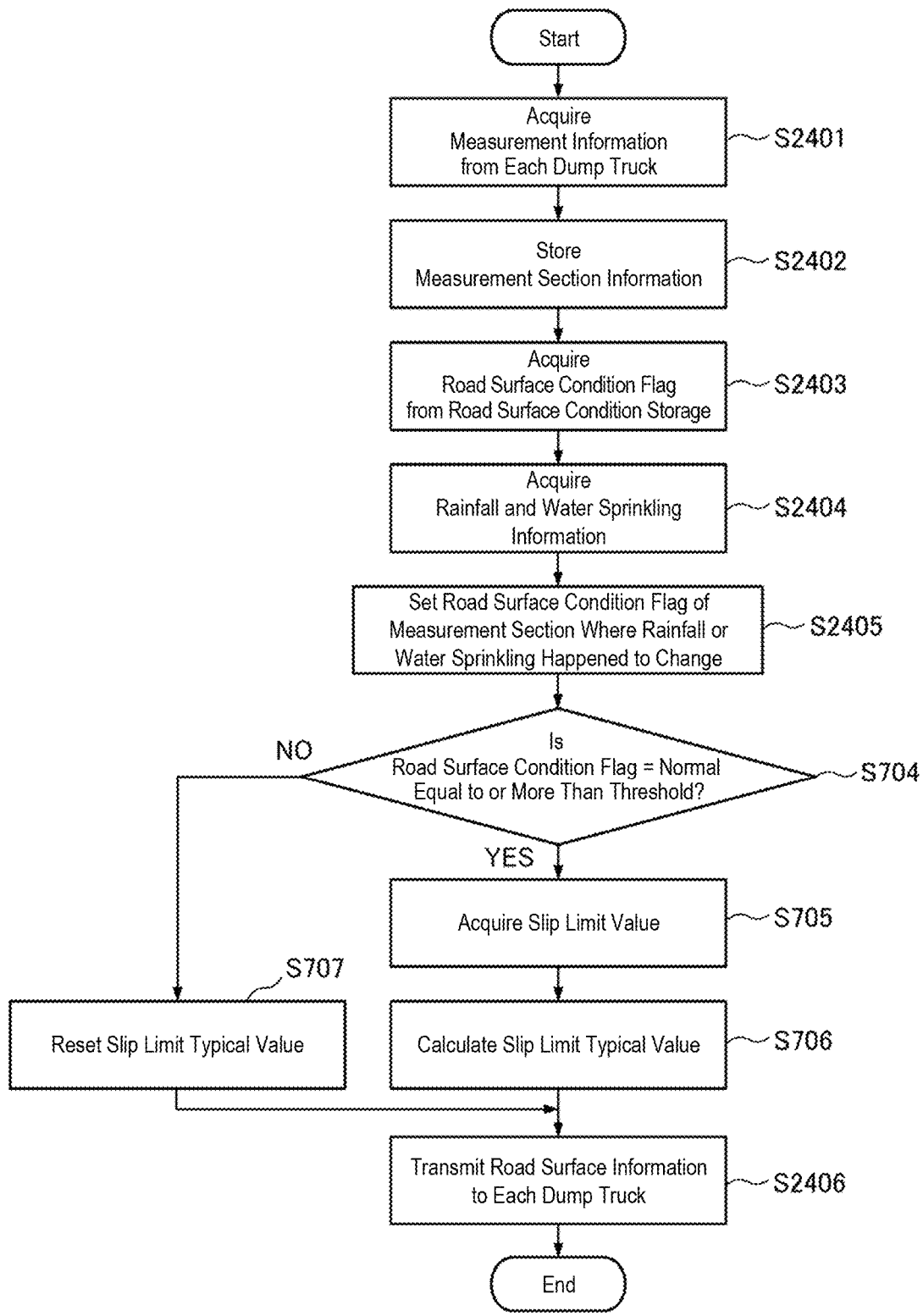
FIG. 24 is a drawing illustrating a process flow of a control system of the second embodiment of the present invention.

In this embodiment, the control system 500 performs the process of Step S307 and Step S308 that the dump truck 100 performs in the above-described first embodiment. FIG. 24 illustrates a process flow that the control system 500 performs.

In Step S2401, the measurement information is acquired from each of the dump trucks 100 at a preset cycle. The acquired measurement information is stored in the temporary storage unit 503 as the measurement information table (see FIG. 8) for each of the dump trucks 100.

In Step S2402, measurement section information illustrated in FIG. 25 is stored in the temporary storage unit 503. The measurement section information is a collection of all the information stored in Step S702 of the above-described first embodiment for each of the dump trucks 100.

In Step S2403, a road surface condition flag is acquired from the slip limit typical value storage unit (hereinafter, also referred to as a typical value storage unit) 502. In the typical value storage unit 502, similarly to the typical value storage unit 313 of the above-described first embodiment, a measurement section table including a starting point position, an ending point position, a gradient, a turning radius, a slip limit typical value, and a road surface condition flag that correspond to each of the measurement sections (ID) is stored.

In Step S2404, rainfall and water sprinkling information is acquired. The control system 500 is configured to be able to acquire the water sprinkling information of whether or not water is sprinkled on the road surface by a water sprinkler and the like and the rainfall information regarding the amount and position of a rainfall.

In Step S2405, for a route where a water sprinkler has sprinkled water and a route where a predetermined amount or more of a rainfall has happened, the road surface condition flag is set to "Change (0)." The process from Step S704 to Step S707 is similar to the above-described first embodiment.

After the process of Step S706 or S707 ends, in Step S2406, road surface information on each of the measurement sections is generated and transmitted to each of the dump trucks 100.

In this embodiment, as described above, the vehicle control device 300 calculates the maximum acceleration/deceleration from the slip limit values at a plurality of positions acquired by the plurality of dump trucks 100. Thus, by detecting the slip limit values at the plurality of positions using the plurality of dump trucks 100, the road surface information of the travel route can be efficiently generated in a short time.

Other effects of the second embodiment are similar to the above-described first embodiment.

The present invention is not limited to the above-described embodiments, and various variations are included. For example, the above-described embodiments have been described in detail for describing the present invention in an easy-to-understand manner and are not necessarily limited to one that includes all the described configurations. A part of the configuration in one embodiment can be replaced by a configuration in another embodiment, and the configuration in another embodiment can be added to the configuration in one embodiment. Further, addition, omission, and replacement of another configuration can be performed on a part of the configuration in each embodiment.

For example, in the above-described embodiments, while the dump truck 100 has been described as an example of a conveying vehicle, the present invention is not limited to this, and the present invention is applicable to, for example, a wheel loader and the like.

In the above-described embodiments, while an unattended dump truck has been described as an example of a conveying vehicle, the present invention is not limited to this, and the present invention is applicable also to a conveying vehicle that requires a driver.

In the above-described embodiments, while an example in which both the maximum acceleration and the maximum deceleration at which the wheels 103 can maintain the grip state against a road surface has been indicated are calculated, the present invention is not limited to this. For example, in a case where a vehicle weight is considerably heavy, such as a case of the dump truck 100, the slip state (state where braking is impossible) is likely to happen during decelerating and the slip state is less likely to happen during accelerating. In this case, since the slip state is less likely to happen even when the dump truck 100 accelerates to the upper limit of acceleration performance of the dump truck 100, the target travel speed at each of the travel positions may be set by not calculating the maximum acceleration but calculating only the maximum deceleration.

In the second embodiment, while an example in which each of the dump trucks 100 performs the calculation of the slip rate and slip limit value, the calculation of the maximum acceleration/deceleration, and the like has been indicated, the present invention is not limited to this. For example, data required for the calculation of the slip rate and slip limit value, the maximum acceleration/deceleration, and the like may be transmitted from each of the dump trucks 100 to the control system 500, and the control system 500 may perform the calculation of the slip rate and slip limit value, the maximum acceleration/deceleration, and the like for all the dump trucks 100.

In the second embodiment, while an example in which a plurality of dump trucks 100 all have the same configuration has been indicated, the present invention is not limited to this. For example, only a part of the dump trucks 100 may be configured to calculate the slip rate and the slip limit value. Then, for the remaining dump trucks 100, the speed may be controlled based on the road surface information and the like from the control system 500. In this case, sensors and the like for calculating the slip rate and the slip limit value do not have to be disposed in all the dump trucks 100.

In the above-described embodiments, while an example in which the slip limit value is calculated for each of the slip rates has been indicated, the present invention is not limited to this. For example, in a case where a plurality of slip rates are calculated for the same measurement section, the slip limit value may be calculated using an average of the slip rates, an average of the accelerations/decelerations, and the like.

REFERENCE SIGNS LIST

100 Dump truck (Conveying vehicle)
101 Vehicle body
103 Wheel
103a Front wheel (Driven wheel)
103b Rear wheel (Driving wheel)
210 Communication device
300 Vehicle control device
500 Control system

The invention claimed is:

1. A conveying vehicle comprising:
   a vehicle body provided with a wheel; and
   a vehicle control device,
   wherein the conveying vehicle travels on a travel route, the vehicle control device:
      calculates slip rates of the wheel at a plurality of positions on the travel route;
      calculates and stores a slip limit value from each of the slip rates, the slip limit value being a friction coefficient value between a road surface and the wheel at a boundary of a grip state and a slip state of the wheel against the road surface at each of the plurality of positions;
      reads out the slip limit value to calculate at least one of a maximum acceleration and a maximum deceleration of the conveying vehicle at which the wheel is capable of maintaining the grip state against the road surface at each of the plurality of positions; and
      during travelling to a target position on the travel route, sets a target travel speed at a travel position between the conveying vehicle and the target position according to a target speed at the target position and at least one of the maximum acceleration and the maximum deceleration calculated from the slip limit value when the conveying vehicle travels at the travel position.

2. The conveying vehicle according to claim 1, wherein the wheels include a driving wheel and a driven wheel, and the slip rate is a slip rate of the driven wheel.

3. The conveying vehicle according to claim 1, wherein the vehicle control device:
   updates the slip limit value by repeatedly passing the plurality of positions by the conveying vehicle,
   detects a change in slipperiness of the road surface from a change of the slip limit value by updating, and
   changes at least one of the maximum acceleration and the maximum deceleration according to the change in slipperiness of the road surface.

4. The conveying vehicle according to claim 1, wherein the vehicle control device:
   divides the travel route into a plurality of sections, and
   calculates at least one of the one maximum acceleration and the one maximum deceleration from a plurality of the slip limit values in each of the sections.

5. The conveying vehicle according to claim 1, wherein the vehicle control device sets the target travel speed in an order from the travel position close to the target position in a case where the target travel speed at a plurality of the travel positions between the conveying vehicle and the target position are set.

6. The conveying vehicle according to claim 1, further comprising
   a communication device capable of communicating with a control system,
   wherein the vehicle control device calculates at least one of the maximum acceleration and the maximum deceleration from slip limit values at a plurality of positions acquired by a plurality of conveying vehicles.

* * * * *